US00RE39369E

(19) United States
(12) Reissued Patent
Alcorn et al.

(10) Patent Number: US RE39,369 E
(45) Date of Reissued Patent: *Oct. 31, 2006

(54) ELECTRONIC CASINO GAMING SYSTEM WITH IMPROVED PLAY CAPACITY, AUTHENTICATION AND SECURITY

(75) Inventors: Allan E. Alcorn, Portola Valley, CA (US); Michael Barnett, San Carlos, CA (US); Louis D. Giacalone, Jr., Henderson, NV (US); Adam E. Levinthal, Redwood City, CA (US)

(73) Assignee: IGT, Reno, NV (US)

( * ) Notice: This patent is subject to a terminal disclaimer.

(21) Appl. No.: 10/224,699

(22) PCT Filed: Jun. 17, 1996

(86) PCT No.: PCT/US96/10463

§ 371 (c)(1),
(2), (4) Date: Mar. 10, 1998

(87) PCT Pub. No.: WO97/01902

PCT Pub. Date: Jan. 16, 1997

Related U.S. Patent Documents

Reissue of:
(64) Patent No.: 6,106,396
Issued: Aug. 22, 2000
Appl. No.: 08/981,882
Filed: Mar. 10, 1998

U.S. Applications:
(63) Continuation-in-part of application No. 08/497,662, filed on Jun. 29, 1995, now Pat. No. 5,643,086.

(51) Int. Cl.
*A63F 13/00* (2006.01)
*G06F 5/00* (2006.01)

(52) U.S. Cl. ..... 463/29; 380/25

(58) Field of Classification Search ..... 463/1, 463/25, 29, 40–44, 20, 16; 700/91; 380/251, 380/4, 9, 23, 25, 30, 49, 50, 59
See application file for complete search history.

(56) References Cited

U.S. PATENT DOCUMENTS 3,825,905 A 7/1974 Allen, Jr. ..... 340/172.5

(Continued)

FOREIGN PATENT DOCUMENTS

EP 0 685 246 A1 12/1995

(Continued)

OTHER PUBLICATIONS

Bauspiess, et al., "Requirements For Cryptographic Hash Functions," *Computers and Security,* 5:427–437 (Sep. 11, 1992).

(Continued)

*Primary Examiner*—John M. Hotaling, II
(74) *Attorney, Agent, or Firm*—Beyer Weaver & Thomas LLP

(57) ABSTRACT

The electronic casino gaming system consists of several system components, including a microprocessor (12), a main memory unit (13) that is typically a random access memory, and a system boot ROM (14). Also included in the electronic casino gaming system are a non-volatile RAM (17), a mass storage unit (18), a disk subsystem (19), and a PCI bus (20). The disk subsystem (19) preferably supports SCSI-2 with options of fast and wide. A video subsystem (22) is also included in the electronic casino gaming system and is coupled to the PCI bus (20) to provide full color still images and MPEG movies.

68 Claims, 3 Drawing Sheets

U.S. PATENT DOCUMENTS

| | | | | | |
|---|---|---|---|---|---|
| 3,838,264 | A | | 9/1974 | Maker | 253/153 |
| 4,193,131 | A | | 3/1980 | Lennon et al. | 375/2 |
| 4,200,770 | A | | 4/1980 | Hellman et al. | 178/22 |
| 4,218,582 | A | | 8/1980 | Hellman et al. | 178/22 |
| 4,354,251 | A | | 10/1982 | Hellwig et al. | 364/900 |
| 4,355,390 | A | | 10/1982 | Hellwig et al. | 371/21 |
| 4,405,829 | A | | 9/1983 | Rivest et al. | 178/22.1 |
| 4,458,315 | A | | 7/1984 | Uchenick | 364/200 |
| 4,462,076 | A | * | 7/1984 | Smith, III | 463/29 |
| 4,467,424 | A | | 8/1984 | Hedges et al. | 364/412 |
| 4,494,114 | A | | 1/1985 | Kaish et al. | 340/825.31 |
| 4,519,077 | A | | 5/1985 | Amin | 371/21 |
| 4,525,599 | A | | 6/1985 | Curran et al. | 178/22.08 |
| 4,582,324 | A | | 4/1986 | Koza et al. | 273/138 A |
| 4,607,844 | A | | 8/1986 | Fullerton | 273/143 R |
| 4,652,998 | A | * | 3/1987 | Koza et al. | 463/26 |
| 4,658,093 | A | | 4/1987 | Hellman | 380/25 |
| 4,727,544 | A | | 2/1988 | Brunner et al. | 371/21 |
| 4,752,068 | A | | 6/1988 | Endo | 273/1 E |
| 4,759,064 | A | | 7/1988 | Chaum | 380/30 |
| 4,817,140 | A | | 3/1989 | Chandra et al. | 380/4 |
| 4,837,728 | A | | 6/1989 | Barrie et al. | 364/412 |
| 4,845,715 | A | | 7/1989 | Francisco | 371/53 |
| 4,848,744 | A | | 7/1989 | Steininger et al. | 273/1 E |
| 4,856,787 | A | | 8/1989 | Itkis | 273/237 |
| 4,865,321 | A | | 9/1989 | Nakagawa et al. | 273/85 |
| 4,911,449 | A | | 3/1990 | Dickinson et al. | 273/143 |
| 4,930,073 | A | | 5/1990 | Cina, Jr. | 364/300 |
| 4,944,008 | A | | 7/1990 | Piosenka et al. | 380/46 |
| 4,951,149 | A | | 8/1990 | Faroudja | 358/230 |
| 5,004,232 | A | | 4/1991 | Wong et al. | 273/435 |
| 5,021,772 | A | | 6/1991 | King et al. | 340/724 |
| 5,050,212 | A | | 9/1991 | Dyson | 380/25 |
| 5,103,081 | A | | 4/1992 | Fisher et al. | 235/464 |
| 5,109,152 | A | | 4/1992 | Takagi et al. | 235/380 |
| 5,146,575 | A | | 9/1992 | Nolan | 395/425 |
| 5,155,680 | A | | 10/1992 | Wiedener | 364/406 |
| 5,155,768 | A | | 10/1992 | Matsuhara | 380/23 |
| 5,161,193 | A | * | 11/1992 | Lampson et al. | 713/151 |
| 5,179,517 | A | | 1/1993 | Sarbin | 364/410 |
| 5,224,160 | A | * | 6/1993 | Paulini et al. | 713/187 |
| 5,235,642 | A | | 8/1993 | Wobber et al. | 380/25 |
| 5,259,613 | A | | 11/1993 | Marnell | 273/138 A |
| 5,283,734 | A | | 2/1994 | Von Kohorn | 364/412 |
| 5,288,978 | A | | 2/1994 | Iijima | 235/380 |
| 5,291,585 | A | | 3/1994 | Sato et al. | 395/500 |
| 5,297,205 | A | | 3/1994 | Audebert et al. | 380/23 |
| 5,326,104 | A | | 7/1994 | Pease et al. | 273/138 |
| 5,342,047 | A | | 8/1994 | Heidel et al. | 273/85 |
| 5,343,527 | A | | 8/1994 | Moore | 380/4 |
| 5,398,932 | A | * | 3/1995 | Eberhardt et al. | 463/29 |
| 5,421,006 | A | * | 5/1995 | Jablon et al. | 714/36 |
| 5,465,364 | A | | 11/1995 | Lathrop et al. | 395/700 |
| 5,488,702 | A | | 1/1996 | Byers et al. | 395/186 |
| 5,489,095 | A | | 2/1996 | Goudard et al. | 273/138 |
| 5,507,489 | A | | 4/1996 | Reibel et al. | 273/138 A |
| 5,586,766 | A | | 12/1996 | Forte et al. | 273/309 |
| 5,586,937 | A | | 12/1996 | Menashe | 463/41 |
| 5,604,801 | A | | 2/1997 | Dolan et al. | 380/21 |
| 5,611,730 | A | | 3/1997 | Weiss | 463/20 |
| 5,643,086 | A | | 7/1997 | Alcorn et al. | 463/29 |
| 5,644,704 | A | | 7/1997 | Pease et al. | 395/183.18 |
| 5,655,965 | A | | 8/1997 | Takemoto et al. | 463/20 |
| 5,668,945 | A | | 9/1997 | Ohba et al. | 395/186 |
| 5,704,835 | A | | 1/1998 | Dietz, II | 463/20 |
| 5,707,286 | A | | 1/1998 | Carlson | 463/16 |
| 5,725,428 | A | | 3/1998 | Achmuller | 463/20 |
| 5,737,418 | A | | 4/1998 | Saffari et al. | 380/9 |
| 5,742,616 | A | | 4/1998 | Torreiter et al. | 371/22.4 |
| 5,759,102 | A | | 6/1998 | Pease et al. | 463/42 |
| 5,768,382 | A | * | 6/1998 | Schneier et al. | 380/251 |
| 5,934,672 | A | | 8/1999 | Sines et al. | 273/143 R |
| 5,991,399 | A | * | 11/1999 | Graunke et al. | 380/279 |
| 6,071,190 | A | | 6/2000 | Weiss et al. | 463/25 |
| 6,104,815 | A | | 8/2000 | Alcorn et al. | 380/251 |
| 6,149,522 | A | | 11/2000 | Alcorn et al. | 463/29 |
| 6,195,587 | B1 | | 2/2001 | Hruska et al. | 700/2 |
| 6,620,047 | B1 | | 9/2003 | Alcorn et al. | 463/37 |
| 6,851,607 | B1 | * | 2/2005 | Orus et al. | 235/380 |
| 2004/0002381 | A1 | | 1/2004 | Alcorn et al. | 463/37 |

FOREIGN PATENT DOCUMENTS

| | | | |
|---|---|---|---|
| GB | 2 121 569 | | 12/1983 |
| JP | 6-327831 | | 11/1994 |
| JP | 7-31737 | | 2/1995 |
| WO | WO 99/65579 | * | 12/1999 |
| WO | WO 00/33196 | * | 6/2000 |

OTHER PUBLICATIONS

Complaint for patent infringement filed by Aristocrat Technologies, et al. dated Jan. 22, 2002, Civil Action No. CV–S–02–0091.

Court docket for Civil Action No. CV–S–02–0091 listing papers filed.

Bakhtiari, et al., "Cryptographic Hash Functions: A Survey," Centre for Computer Security Research, 1995, 3 introductory pages and pp. 1–26.

Federal Information Processing Standards (FIPS) Publication 180 entitled "Secure Hash Standard" dated May 11, 1993, title page, abstract page and pp. 1–20.

Federal Information Processing Standards (FIPS) Publication 186 entitled "Digital Signature Standard (DSS)" dated May 19, 1994, 17 pages.

Document entitled "Fact Sheet on Digital Signature Standard" dated May 1994, 6 pages.

Federal Information Processing Standards (FIPS) Publication 180–1 entitled "Secure Hash Standard" dated Apr. 17, 1995, 2 title pages, abstract page and pp. 1–21.

Davida, G. et al., "Defending Systems Against Viruses through Crytographic Authentication," Proceedings of the Symposium on Security and Privacy, *IEEE Comp. Soc. Press,* pp. 312–318 (May 1, 1989).

Hellmann, Martin E., "The Mathematics of Public–Key Cryptography," Scientific American, vol. 241, No. 8, Aug. 1979, pp. 146–152 and 154–157.

Rivest, et al., "A Method for Obtaining Digital Signatures and Public–Key Cryptosystems," Communications of the ACM, vol. 21, No. 2, Feb. 1978, pp. 120–126.

Translation of communication from the Japanese Patent Office with respect to JP 504453/97 dated Dec. 7, 2004.

Answer and Counterclaims to Second Amended Complaint filed in connection with Civil Action No. CV–S–01–1498, pp. 1–26 and certificate of service page.

Defendants' Supplemental Response to Plaintiffs' First Set of Interrogatories filed in connection with Civil Action No. CV–S–01–1498, pp. 1–3, 50–68 and 85–86.

* cited by examiner

ELECTRONIC CASINO GAMING SYSTEM WITH IMPROVED PLAY CAPACITY, AUTHENTICATION AND SECURITY

Matter enclosed in heavy brackets [ ] appears in the original patent but forms no part of this reissue specification; matter printed in italics indicates the additions made by reissue.

[This application is the national stage of International Application No. PCT/US96/10463, filed on Jun. 17, 1996, which is a continuation-in-part of U.S. application Ser. No. 08/497,662, now U.S. Pat. No. 5,643,086, filed on Jun. 29, 1995.]

*Notice: More than one reissue application has been filed for the reissue of U.S. Pat. No. 6,106,396. The reissue applications are Reissue application Ser. No. 10/225,096 filed Aug. 21, 2002, Reissue application Ser. No. 10/224,680 filed Aug. 21, 2002, Reissue application Ser. No. 10/225,116 filed Aug. 21, 2002, Reissue application Ser. No. 10/225,097 filed Aug. 21, 2002 and Reissue application Ser. No. 10/224, 699 filed Aug. 21, 2002 (the present application), all of which are divisional reissues of U.S. Pat. No. 6,106,396, which issued from U.S. Ser. No. 08/981,882 which is the U.S. national phase of International Application No. PCT/US96/10463 filed Jun. 17, 1996, which is a continuation-in-part of U.S. Ser. No. 08/497,662 filed Jun. 29, 1995, now U.S. Pat. No. 5,643,086.*

BACKGROUND OF THE INVENTION

1. Field of the Invention

This invention relates to microprocessor based gaming Systems used in gambling casinos.

2. Brief Description of the Prior Art

Microprocessor based gaming systems are known which are used in gambling casinos to augment the traditional slot machine games (e.g. three reel single or multi-line games) and card games, such as poker and black jack. In a typical gaming system of this type, a microprocessor based system includes both hardware and software components to provide the game playing capabilities. The hardware components include a video display for displaying the game play, mechanical switches for enabling player selection of additional cards or game play choices, coin acceptors and detectors and the electronic components usually found in a microprocessor based system, such as random access memory (RAM), read only memory (ROM), a processor and one or more busses. The software components include the initialization software, credit and payout routines, the game image and rules data set, and a random number generator algorithm. In order to be acceptable for casino use, an electronic gaming system must provide both security and authentication for the software components. For this reason, gaming commissions have heretofore required that all software components of an electronic gaming system be stored in unalterable memory, which is typically an unalterable ROM. In addition, a copy of the contents of the ROM or a message digest of the contents (or both) are normally kept on file in a secure location designated by the gaming commission so that the contents of an individual ROM removed from a gaming machine can be verified against the custodial version.

In a typical arrangement, a message digest of the ROM contents is initially generated prior to the installation of the ROM in the machine by using a known algorithm usually referred to as a hash function. A hash function is a computation procedure that produces a fixed-size string of bits from a variable-size digital input. The fixed-sized string of bits is termed the hash value. If the hash function is difficult to invert—termed a one-way hash function—the hash function is also termed a message digest function, and the result is termed the message digest. The message digest is unique to any given variable size input data set, i.e., the game data set stored in the ROM. When it becomes necessary to later authenticate the ROM from any given machine, the ROM is physically removed from the game console and the message digest of the ROM contents is computed directly from the ROM using the original hash function. The computed message digest is compared with the message digest on file at the designated custodial location (typically in the casino itself). This procedure is typically carried out whenever a machine produces a payoff beyond a given threshold value. If the two message digests match, then the contents of the ROM are considered to be authenticated (verified) and the payout is made to the player.

While such electronic casino gaming systems have been found to be useful in promoting casino game play, the restriction requiring that the casino game program be stored in unalterable ROM memory, leads to a number of disadvantageous limitations. First, due to the limited capacity of the ROM storage media traditionally used to hold the program, the scope of game play available with such systems is severely limited. For sophisticated games using motion video and audio multi-media elements, much more memory capacity, on the order of hundreds of megabytes, is necessary. However, physical verification of such a large quantity of physical devices is not practical, and has thus far been an impediment to creating sophisticated games with more player appeal. Second, the authentication check is only conducted on a limited basis (usually after a jackpot) or other significant winning game outcome, and the authentication procedure requires that game play be halted until the ROM contents have been found to be authentic.

SUMMARY OF THE INVENTION

[The invention comprises an electronic casino gaming system which greatly expands casino game play capability and enhances security and authentication capabilities. More particularly, the invention comprises an electronic casino gaming system and method having greatly expanded mass storage capability for storing a multiplicity of high resolution, high sound quality casino type games, and provides enhanced authentication of the stored game program information with a high security factor.]

[According to a first aspect of the invention, authentication of a casino game data set is carried out within the casino game console using an authentication program stored in an unalterable ROM physically located within the casino game console. The casino game data set and a unique signature are stored in a mass storage device, which may comprise a read only unit or a read/write unit and which may be physically located either within the casino game console or remotely located and linked to the casino game console over a suitable network. The authentication program stored in the unalterable ROM performs an authentication check on the casino game data set at appropriate times, such as prior to commencement of game play, at periodic intervals or upon demand. At appropriate occasions, the contents of the unalterable ROM can be verified by computing the message digest of the unalterable ROM contents and comparing this computed message digest with a securely stored copy of the message digest computed from the ROM contents prior to installation in the casino game console.]

[From a process standpoint, this aspect of the invention comprises a method of authenticating a data set of a casino style game which consists of two phases: a game data set preparation phase and a game data set checking phase. In the game data set preparation phase, the method proceeds by providing a data set for a casino game, computing a first abbreviated bit string unique to the casino game data set, encrypting the first abbreviated bit string to provide an encrypted signature of the casino game data set, and storing the casino game data set and the signature in a mass storage device. The first abbreviated bit string is preferably computed using a hash function to produce a message digest of the casino game data set. The signature is then encrypted from the message digest. After storage of the game data set and unique signature, this information is installed in a casino game console. The casino game data set checking phase proceeds by computing a second abbreviated bit string from the stored casino game data set using the same hash function, decrypting the stored encrypted signature to recover the first abbreviated bit string, and comparing the first and second abbreviated bit strings to determine whether the two strings match. If a match does occur the casino game data set is deemed authentic; if there is no match, authentication is denied and game play is prohibited.]

[The encryption/decryption process is preferably performed using a private key/public key technique in which the first abbreviated bit string is encrypted by the game manufacturer using a private encryption key maintained in the custody of the game manufacturer. The decryption of the signature is performed using a public key which is contained in an unalterable read only memory element located in the game console, along with the casino game data set. The casino game data set is preferably stored in a mass storage device, such as a magnetic or CD-ROM disk drive unit or a network file unit, the selected unit having a relatively large capacity. The actual size of the mass storage device will depend upon the casino game storage requirements and can be tailored to any specific application.]

[Each time a casino game data set is transferred from the mass storage device to the main memory of the system, the authentication routine is run. The authentication routine can also be means of an operator switch mounted in the game console or remotely via a network. Consequently, the authenticity of the data set can be automatically checked whenever the transfer occurs and at other appropriate times.]

[In order to detect attempts to tamper with the contents of the unalterable read only memory element located in the game console, a message digest computed for the authentication program stored therein is stored in a secure manner in a different location from the game console, such as the casino operator's security facilities or the facilities of a gaming commission (or both). The authenticity of the unalterable read only memory element is checked in the same way as that now performed in prior art devices: viz. computing the message digest directly from the unalterable read only memory device, and comparing the message digest thus computed with the custodial version.]

[From an apparatus standpoint, the first aspect of the invention comprises an electronic casino gaming system having means for providing authentication of a game data set of a casino type game prior to permitting game play, the system including first means for storing a casino game data set and a signature of the casino game data set, the signature comprising an encrypted version of a unique first abbreviated bit string computed from the casino game data set; second means for storing an authentication program capable of computing a second abbreviated bit string from the casino game data set stored in the first storing means and capable of decrypting the encrypted signature stored in the first storing means to recover the first abbreviated bit string; processing means for enabling the authentication program to compute an abbreviated bit string from the casino game data set stored in the first storing means and for enabling the authentication program to decrypt the encrypted signature; and means for comparing the computed second abbreviated bit string with the decrypted abbreviated bit string to determine whether a match is present. The first storing means preferably comprises a mass storage device, such as a disk drive unit, a CD-ROM unit or a network storage unit. The second storing means preferably comprises an unalterable read only memory in which the authentication program is stored.]

[According to a second aspect of the invention, the authentication program stored in the unalterable ROM located within the casino game console is used to test the authenticity of all other programs and fixed data stored in memory devices in the electronic casino gaming system, such as a system boot ROM, memory devices containing the operating system program, system drivers and executive/loader programs, and other memory devices incorporated into the electronic casino game system architecture. The contents of each such memory device, whether program information or fixed data, include signatures encrypted from message digests computed using a hash function from the original program information or fixed data set. Upon system initialization, the authentication program in the unalterable ROM is used to authenticate the individual memory device contents in essentially the same fashion as that used to authenticate the casino game data sets. More specifically, the message digest for the given program or fixed data set is computed using the same hash function originally used to produce the message digest for that program or fixed data set. The encrypted signature is decrypted using the proper decryption program and decryption key to recover the message digest. The two versions of the message digest are then compared and, if found to be matching, the concerned program or fixed data set is deemed authentic and is permitted to be used by the system. Once all of the concerned programs and fixed data sets have been so authenticated, the casino game data set authentication procedure is run, after which game play is permitted (provided a match occurs).]

[From a process standpoint, this second aspect of the invention comprises a method of authenticating a program or data set of a casino style game which consists of two phases: a program or fixed data set preparation phase, and a program or fixed data set checking phase. In the program or fixed data set preparation phase, the method proceeds by providing a program or fixed data set for a casino game, computing a first abbreviated bit string unique to the program or fixed data set, encrypting the first abbreviated bit string to provide an encrypted signature of the program or fixed data set, and storing the program or fixed data set and the signature in a memory device. The first abbreviated bit string is preferably computed using a hash function to produce a message digest of the program or fixed data set. The signature is then encrypted from the message digest. After storage of the program or fixed data set and unique signature in the memory device, the memory device is installed in a casino game console. The casino game program or fixed data set checking phase proceeds by computing a second abbreviated bit string from the stored casino game program or fixed data set stored in the memory device using the same hash function, decrypting the encrypted signature stored in the memory device to recover the first abbreviated bit string, and comparing the first and second abbreviated bit strings to determine whether the two strings match. If a match does occur, the casino game program or fixed data set is deemed authentic; if there is no match, authentication is denied and use of that casino game program or fixed data set is prohibited.]

[The authentication routine is run each time a given casino game program or fixed data set needs to be called or used. The authentication routine can also be run automatically on a periodic basis, or on demand—either locally by means of an operator switch mounted in the casino game console or remotely via a network. Consequently, the authenticity of the casino game program or fixed data set can be automatically checked whenever use of that program or fixed data set is required and at other appropriate times, such as in the course of a gaming commission audit.]

[From an apparatus standpoint this second aspect of the invention comprises an electronic casino gaming system for providing authentication of a casino game program or fixed data set prior to permitting system use of that casino game program or fixed data set, the system including first means for storing a casino game program or fixed data set and a signature of the casino game program or fixed data set; the signature comprising an encrypted version of a unique first abbreviated bit string computed from the casino game program or fixed data set; second means for storing an authentication program capable of computing a second abbreviated bit string from the casino game program or fixed data set stored in the first storing means and capable of decrypting the encrypted signature stored in the first storing means to recover the first abbreviated bit string; processing means for enabling the authentication program to compute an abbreviated bit string from the casino game program or fixed data set stored in the first storing means and for enabling the authentication program to decrypt the encrypted signature; and means for comparing the computed second abbreviated bit string with the decrypted abbreviated bit string to determine whether a match is present. The first storing means preferably comprises a memory device, such as a read only memory or random access memory. The second storing means preferably comprises an unalterable read only memory in which the authentication program is stored.]

[Electronic casino game systems incorporating the invention provide a vastly expanded capacity for more sophisticated and attractive casino-style games, while at the same time improving the authentication of the games without comprising security. In addition, casino game systems incorporating the invention provide great flexibility in changing casino game play, since the casino game data sets representing the various games can be stored in alterable media rather than read only memory units as with present casino game systems.]

[By separating the authentication process from the casino game data set storage, the invention affords secure distribution and execution of program code and data, regardless of the particular distribution or storage technique employed. More specifically, the invention allows the casino game data set to reside in any form of secondary storage media, such as the traditional ROM storage, hard magnetic disk drives and CD-ROM drives, or networked file systems. So long as the authentication procedure conducted on the game data set is performed using the authentication program stored in an unalterable ROM, and so long as that ROM can be verified reliably, any casino game data set can be loaded from any source and can be verified by the system at any time: either prior to use, during run-time, periodically during run-time or upon demand. The large quantities of storage that can be made available in a secure fashion using the invention, facilitates the creation of casino gaming systems offering both an increased diversity of games, and individual games of superior quality. In addition, the authentication of all casino game program and fixed data software ensures the integrity of all system software both prior to game play and thereafter at periodic or random intervals.]

*In one aspect, the invention is directed to a casino gaming apparatus, comprising: a casino game console; a video display unit; a first memory disposed in said casino game console; a second memory disposed in said casino game console, said second memory having encrypted gaming data stored therein, said encrypted gaming data comprising data relating to a casino game; a processor disposed in said casino game console and being operatively coupled to said video display unit, said first memory and said second memory, said processor causing said encrypted gaming data stored in said second memory to be decrypted to generate decrypted gaming data, and said processor causing a check to be performed utilizing said decrypted gaming data.*

*In another aspect, the invention is directed to a casino gaming apparatus, comprising: a casino game console; a video display unit; a sound-generating apparatus; a first memory disposed in said casino game console; a second memory disposed in said casino game console, said second memory having encrypted gaming data stored therein and unencrypted gaming data stored therein, said encrypted gaming data comprising data relating to a casino game and said unencrypted gaming data comprising data relating to a casino game; a nonvolatile memory disposed in said casino game console; and a processor disposed in said casino game console and being operatively coupled to said video display unit, said sound-generating apparatus, said first memory, said second memory and said nonvolatile memory, said processor causing said encrypted gaming data to be decrypted to generate decrypted gaming data, said processor causing said unencrypted gaming data to be transferred from said second memory to said first memory, said processor causing a check of said unencrypted data to be performed utilizing said decrypted gaming data and said unencrypted data after said unencrypted data has been transferred from said second memory to said first memory, and said processor causing a remedial action to be taken based on said check performed by said processor, said remedial action caused by said processor comprising generation of a message.*

*Other aspects of the invention are defined by the claims set forth at the end of this patent.*

For a fuller understanding of the nature and advantages of the invention, reference should be had to the ensuing detailed description taken in conjunction with the accompanying drawings.

DETAILED DESCRIPTION OF THE PREFERRED EMBODIMENTS

Figure 1:
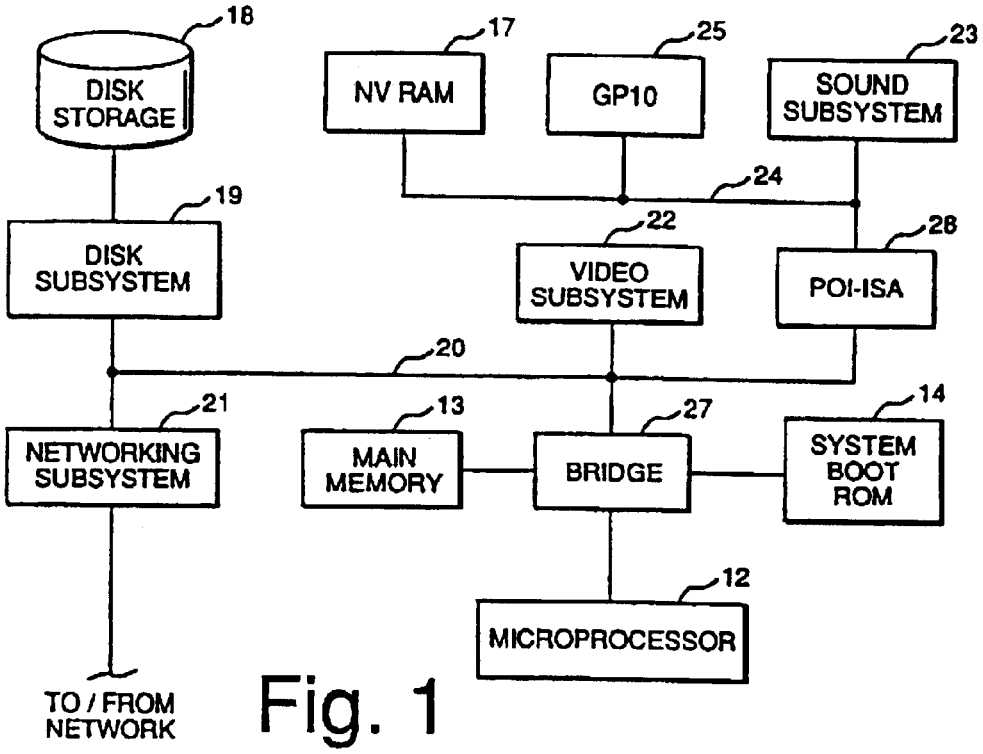
FIG. 1 is a block diagram of a system incorporating the invention.

Turning now to the drawings, FIG. 1 is a block diagram of an electronic casino gaming system incorporating the invention. As seen in this figure, the system consists of several system components under software control. These system components include a microprocessor 12, which may comprise any general purpose microprocessor, such as a Pentium-based microprocessor from Intel Corporation. A main memory unit 13 is provided, which is typically a random access memory having a capacity of between 32 and 64 megabytes for storing the majority of programs and graphics elements during game play. A system boot ROM 14 provides the initialization software required when power is first applied to the system. ROM 14 contains additional programs in read only form, including the operating system, related drivers and the authentication software described in detail below. A non-volatile RAM 17 is a batter backed static RAM capable of maintaining its contents through power cycling. NV RAM 17 stores significant information relating to game play, such as the number of player credits, the last game outcome and certain diagnostic and error information not critical to an understanding of the invention.

A mass storage unit implemented in the FIG. 1 system as a magnetic hard disk drive unit 18 is coupled to and controlled by a disk subsystem 19 of conventional design and operation. Disk drive unit 18 provides storage for the game specific data set, which includes both program data and image data specifying the rules of the various different casino games or single casino game variations, and the types of images and image sequences to be displayed to the game players. The size of the disk drive unit 18 is a function of the number of games and game variations provided for a given system, as well as the amount of data required for each specific game. In general, the more motion video designed into a particular casino game, the more storage required for that casino game software. A disk drive unit 18 with a 4-gigabyte capacity will usually provide sufficient storage capacity. Disk subsystem 19 comprises a disk controller connected to a PCI bus 20 for controlling the disk drive unit 18. Controller 19 preferably supports SCSI-2, with options of fast and wide. It should be noted that a number of different types of locally-based disk drive units may be used in the FIG. 1 system, including a CD-ROM storage unit. Also, the mass storage unit need not be physically located within the game console along with the other elements depicted in FIG. 1: the mass storage unit may be located remotely from the game console and coupled thereto by means of an appropriate network, such as an ethernet, an R5232 link, or some other hard-wired or wireless network link. This latter alternate arrangement is indicated by the inclusion of a network subsystem 21 of appropriate configuration and functional characteristics, which may have ethernet, R5232 serial, or other network compatibility.

A video subsystem 22 is coupled to the PCI bus and provides the capability of displaying full color still images and MPEG movies with a relatively high frame rate (e.g. 30 frames per second) on an appropriate monitor (not shown). Optional 3D texture mapping may be added to this system, if desired.

A sound subsystem 23 having a stereo sound playback capability with up to 16 bit CD quality sound is coupled to an ISA bus 24. A general purpose input/output unit 25 provides interfaces to the game mechanical devices (not illustrated) such as manually actuatable switches and display lights. A first bridge circuit 27 provides an interface between microprocessor 12, ROM 14, main memory 13 and PCI bus 20. Bridge circuit 27 is preferably a TRITON chip set available from INTEL Corporation. A second bridge circuit 28 provides an interface between the PCI bus 20 and the ISA bus 24. Bridge circuit 24 is preferably a type 82378 chip available from Intel Corporation.

Figure 2:
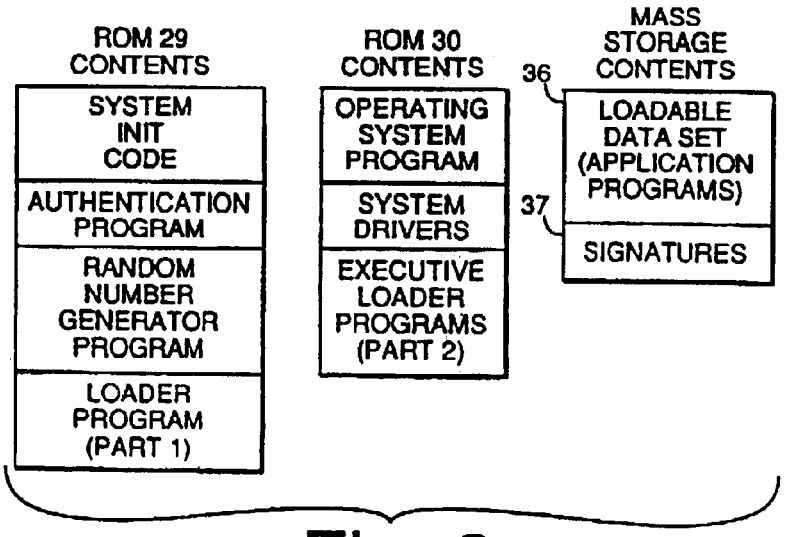
FIG. 2 is a schematic diagram illustrating the contents of the read only memory and the mass storage device.

FIG. 2 illustrates the types of information stored in the system ROM 14 and the mass storage unit. As seen in FIG. 2, the ROM unit 14 used in the FIG. 1 system comprises two separate ROM elements: ROM 29 and ROM 30. ROM 29 must be an unalterable device, such as a Toshiba type C53400 512K×8 bit mask programmed ROM. ROM 30 is preferably an unalterable device like ROM 29, but may comprise a different type of ROM, such as a type 29FO40 field programmable flash ROM available from Intel Corp. ROM 29 contains the system initialization or boot code, an authentication program, a random number generator program and an initial portion of the executive/loader programs. ROM 30 contains the operating system program, the system drivers and the remainder of the executive/loader programs as noted below. The mass storage unit contains the applications, which include the game image and sound data, rules of game play and the like, and the signature associated to each particular casino game.

Figure 3:
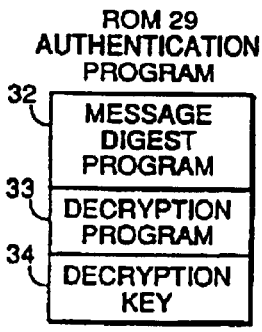
FIG. 3 is a more detailed schematic view of the authentication program stored in the ROM and the game data stored in the mass storage unit.

FIG. 3 illustrates the authentication and application program information in more detail. As seen in this figure, the authentication program stored in unalterable ROM 29 comprises a message digest algorithm component 32, a decryption algorithm component 33, and a decryption key component 34. The message digest algorithm component 32 stored in ROM 29 comprises an exact copy of a hash function program routine used to originally compute a message digest from the loadable game data set 36 in the manner described below. The decryption algorithm component 33 stored in ROM 29 comprises the algorithm required to decrypt any encrypted casino game data set signature using the decryption key component 34.

The decryption key component 34 comprises the decryption key that is required to decrypt any of the encrypted signatures 37 in the manner described below during the authentication routine.

Figure 4:
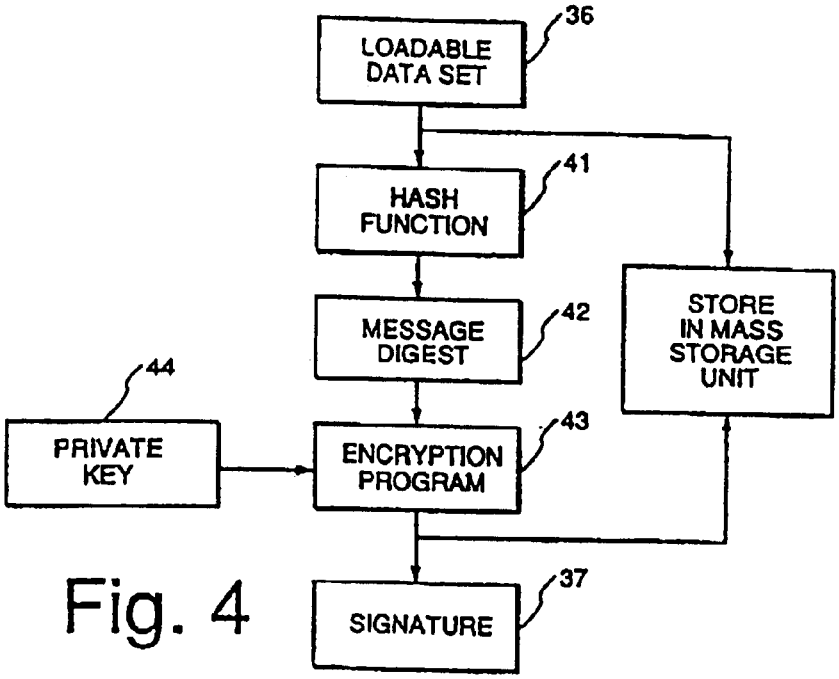
FIG. 4 is a diagram illustrating the preparation of the game data set.

FIG. 4 illustrates the manner in which an encrypted data set signature 37 is generated. A loadable casino game data set 36 is processed using a hash function 41 to generate a message digest 42 which is unique to the loadable game data set 36. The hash function employed may be one of a number of known hash functions, such as the MD2, MD4, and MD5 hash functions and the SHS hash function; or any other suitable hash function capable of producing a unique abbreviated bit string from a variable size input data set. For further information about these hash functions, reference should be had to the publication entitled "Answers To Frequently Asked Questions About Today's Cryptography", Revision 2.0, Oct. 5, 1993, published by RSA Laboratories, Redwood City, Calif., and the publications listed in the references section thereof, the disclosures of which are hereby incorporated by reference. After generation, the message digest 42 is then encrypted with an encryption algorithm 43 using a private encryption key 44 to generate a signature 37 of the message digest. In the preferred embodiment, the two-key (private/public key) encryption technique developed by RSA Data Security, Inc. of Redwood City, Calif., is used. This technique is disclosed and described in U.S. Pat. Nos. 4,200,770, 4,218,582 and 4,405,829, the disclosures of which are hereby incorporated by reference. The signature 37 of the message digest 42 is then stored in the mass storage unit along with the loadable data set 36.

Figure 5:
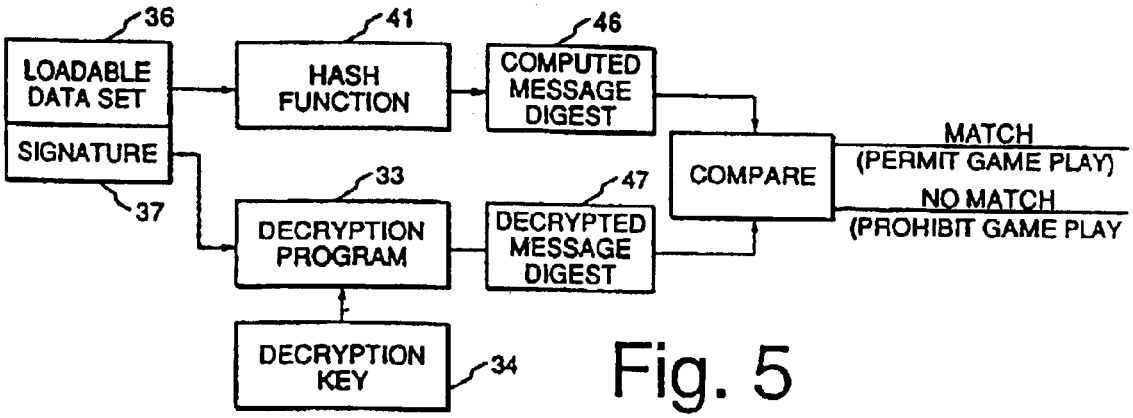
FIG. 5 is a diagram illustrating the authentication procedure for the game data set.

FIG. 5 illustrates the authentication routine carried out in accordance with the invention, when the authentication routine is called (see below), the loadable casino game data set 36 is transferred from the mass storage unit to main memory 13 (unless already there), and the message digest of casino game data set 36 is computed using the message digest algorithm 32. Message digest algorithm 32 uses the same hash function 41 as that used by the manufacturer to prepare the original message digest 42. The result is an unencrypted version 46 of the message digest computed from the casino game data set 36 currently present in the mass storage unit. The encrypted data set signature 37 is decrypted using the public decryption key 34 matching the private key 44 used to originally encrypt the message digest 42 of the casino game data set 36. The message digest 47 decrypted with decryption key 34 is then compared with the message digest 46 computed from the casino game data set 36. If the two message digests match, then the casino game data set 36 is deemed authentic and game play may proceed. If there is no match, either the casino game data set 36 or the signature 37 is deemed corrupted and not authentic. Game play is prohibited and appropriate actions can be taken: e.g. alerting a security employee using a suitable messaging system (an audible alarm, flashing lights, or a network message from the game console to a central security area).

In order to ensure that the authentication routine cannot be bypassed by tampering with the loader program stored in ROM 30, an initial part of the loader program is incorporated into unalterable ROM 29. This initial portion of the loader program requires that the authentication program be called prior to the initiation of any casino game play. Since this initial portion of the loader program is located in the unalterable ROM 29, and since no casino game play can occur until the particular casino game application data set 36 is loaded into main memory 13, the authentication procedure cannot be bypassed by tampering with the software stored in ROM 30.

Since authentication of the game data set 36 and signature 37 is entrusted to the contents of ROM 29, a procedure must be provided to verify the ROM 29 contents. For this purpose, a message digest is computed for the authentication program stored in ROM 29, and this message digest is stored in a secure manner with the casino operator or the gaming commission (or both) along with the hash function used to produce the message digest. This hash function may be the same hash function used to compute the message digest 42 of the casino game data set or a different hash function. In this way, the authenticity of the ROM 29 can be easily checked in the same way as that now performed in prior art devices; viz. computing the message digest directly from the ROM 29 and comparing the message digest thus computed with the custodial version of the message digest. If required by a given gaming commission or deemed desirable by a casino operator, the system may also display the message digest 42 of each particular data set 36 or the encrypted signature version 37 for auditing purposes. In addition, the system may transmit this information via networking subsystem 21 to an on-site or off-site remote location (such as the office of the gaming commission). The message digest displayed or transmitted may comprise the decrypted version or the computed version (or both).

The authentication procedure carried out by means of the message digest program 32, decryption program 33 and decryption key 34 stored in unalterable ROM 29 in the manner described above is also used to authenticate the contents of all memory devices in the FIG. 1 system, such as the contents of ROM 30 (see FIG. 2), the fixed data portions and program components stored in NV RAM 17 and the program and fixed data contents of any memory devices stored in the networking subsystem 21, video subsystem 22, sound subsystem 23, PCI-ISA interface 24, and GPIO unit 25. Each program or fixed data set stored in any memory device in any of these units has an associated signature, which is encrypted from a message digest of the original program or fixed data set using a hash function, which is preferably the same hash function used to prepare the message digest of the casino game data set. Prior to permitting any such program or fixed data set to participate in the system operation, that program or fixed data set is subjected to the authorization procedure to ensure that the message digest computed from the current version of the program or fixed data set matches the message digest decrypted from the encrypted signature associated to the program or fixed data set. In addition, the authentication procedure can be run on each such program or fixed data set at periodic or random intervals (on demand) in a manner essentially identical to that described above with respect to the casino game data set authentication procedure. As a consequence, the integrity of all software in the system is checked prior to the use of that particular software in order to reveal any unauthorized changes to the software portion of the casino gaming system.

Figure 6:
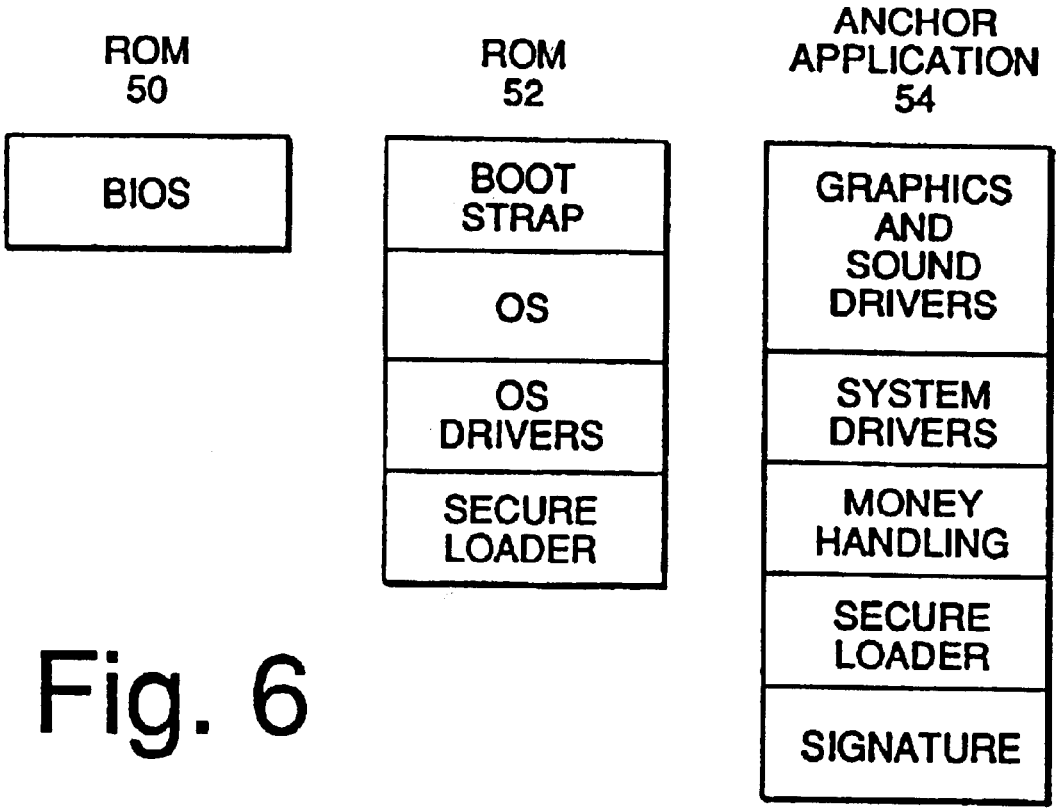
FIG. 6 is a diagram illustrating an alternative approach to the secure loading of software into the system.

An alternative approach to the secure loading of software into the system is depicted in FIG. 6. In this embodiment the basic input/output system (BIOS) software is stored in a ROM 50, the first of two ROMs making up the system boot ROM 14 (FIG. 1). The boot strap code, operating system code (OS), OS drivers and a secure loader are stored in a second ROM 52. An anchor application 54 including graphics and sound drivers, system drivers, money-handling software, a second secure loader, and a signature is stored in the mass storage 18 (FIG. 1).

When power is initially applied to the system on start-up, or when the system experiences a warm restart, the CPU 12 will begin executing code from the BIOS ROM 50. The BIOS is responsible for initializing the motherboard and peripheral cards of the system. After the BIOS has completed the initialization, it jumps to the boot strap code in ROM 252 causing the boot strap to copy the OS, OS drivers. and the secure loader into RAM.

Once in RAM, the OS is started and the secure loader stored in ROM 52 is used to load the anchor application 54 from disk 18. On disk, the anchor application has a signature that is used during the load to verify the validity of the anchor application.

After the anchor application 54 is started, it will be used to load all other applications. The secure loader of the anchor application will check the validity of an application to be loaded by computing the signature and comparing it against the one stored on disk with the application as described above.

An important advantage of the invention not found in 20 prior art systems is the manner in which the casino game data set can be authenticated. In prior art systems, authentication of the casino game data set is normally only done when a payout lying above a given threshold is required by the outcome of the game play, and this requires that the game be disabled while the ROM is physically removed and the ROM contents are verified. In systems incorporating the invention, the authenticity of a given casino game data set can be checked in a variety of ways. For example, the game data set 36 can be automatically subjected to the authentication procedure illustrated in FIG. 5 each time the game is loaded from the mass storage unit into the main memory 13. Thus, as a player selects a casino game for game play in the system, the authenticity of that game actually stored in the mass storage unit is automatically checked using the authentication procedure described above without removing the ROM 29. Further, if desired, the authentication procedure may be initiated in response to the pull of a slot game handle, the detection of a coin insert, the payout of coins or issuing of credit, or any other detectable event related to game play. The authenticity of a given casino game data set 36 can also be checked on demand, either locally at the game console or remotely via a network, by providing a demand procedure. Such a procedure may be initiated, e.g. by providing a manually operable switch in the game console, accessible only to authorized persons, for initiating the authentication routine. Alternatively, the FIG. 1 system may be configured to respond to a demand command generated remotely (e.g. in a security area in the casino or off-site) and transmitted to the game console over a network to the networking subsystem 21.

Another advantage of the invention lies in the fact that the game data set storage capacity of a system incorporating the invention is not limited by the size of a ROM, but is rather dictated by the size of the mass storage unit. As a consequence, games using high resolution, high motion video and high quality stereo sound can be designed and played on systems incorporating the invention. Also, since the mass storage unit need not be a read-only device, and need not be physically located in the game console, the invention affords great flexibility in game content, scheduling and changes. For example, to change the graphic images in a particular casino game or set of games, new casino game data sets can be generated along with new signatures and stored in the mass storage unit by either exchanging disk drives, replacing disks (for read only disk units), or writing new data to the media. In the networked mass storage application, these changes can be made to the files controlled by the network file server. Since the casino game data sets must pass the authentication procedure test, either periodically or on demand, corrupted data sets cannot go undetected. Thus the invention opens up the field of electronic casino gaming systems to readily modifiable games with flexible displays and rules, without sacrificing the essential security of such systems. In fact, security is greatly enhanced by the ability of the invention to authenticate all game data sets both regularly (for each handle pull) and at any time (on demand), without interfering with regular game play (unless no match occurs between the two forms of message digest).

While the above provides a full and complete disclosure of the preferred embodiments of the invention, various modifications, alternate constructions and equivalents may be employed without departing from the true spirit and scope of the invention. For example, while the RSA public/private key encryption technique is preferred (due to the known advantages of this technique). a single, private key encryption technique may be employed, if desired. In a system using this technique, the single key would be stored in ROM 29 in place of the public key 34. Also, the message digest 42 and signature 37 for a given application 36 need not be computed from the entire casino game data set. For example, for some casino games it may be desirable to provide a fixed set of rules while permitting future changes in the casino game graphics, sound or both. For such casino games, it may be sufficient to compute the message digest 42 and signature 37 from only the rules portion of the applications program 36. In other cases, it may be desirable or convenient to maintain the casino game video and audio portions constant, while allowing future changes to the rules of game play. For casino games of this category, the message digest 42 and signature 37 may be computed from the graphics and sound portions of the application program 36. It may also be desirable to compute a message digest 42 and signature 37 from a subset of the rules, graphics or sound portions of a given applications program 36, or from some other subset taken from a given applications program 36. Therefore, the above should not be construed as limiting the scope of the invention, which is defined by the appended claims.

What is claimed is:

[1. An electronic gaming system for providing authentication of a data set associated with a casino type game, said system comprising:

(a) a first storage means for storing a game data set and a game signature comprising an encrypted version of a unique primary abbreviated game bit string computed from said game data set;

(b) a second storage means for storing, an anchor application including a first authentication program capable of determining the validity of said game data set by, computing a complementary abbreviated game bit string from said game data set, decrypting said game signature set to recover said primary abbreviated game bit string, comparing said complementary abbreviated game bit string with said primary abbreviated game bit string to determine whether a match is present, and an anchor signature including an encrypted version of a unique primary abbreviated anchor bit string computed from said anchor application;

(c) a third storage means for storing a second authentication program capable of determining the validity of said anchor application by, computing a complementary abbreviated anchor bit string from said anchor application, decrypting said anchor signature to recover said primary abbreviated anchor bit string, and comparing said complementary abbreviated anchor bit string with said primary abbreviated anchor bit string to determine whether a match is present; and (d) processing means for enabling said first authentication program to determine the validity of said game data set and for enabling said second authentication program to determine the validity of said anchor application.]

[2. An electronic gaming system as recited in claim 1 further comprising a fourth storage means for storing basic input/output system (BIOS) code.]

[3. An electronic gaming system as recited in claim 2 wherein said fourth storage means is an unalterable ROM device.]

[4. An electronic gaming system as recited in claim 1 wherein said third storage means further stores operating system code, operating system drivers, and bootstrap code.]

[5. An electronic gaming system as recited in claim 1 wherein said first storage means and said second storage means comprise a single mass storage means.]

[6. An electronic gaming system as recited in claim 1 wherein said first storage means is a mass storage memory device.]

[7. An electronic gaming system as recited in claim 1 wherein said third storage means is an unalterable read only memory.]

[8. An electronic gaming system as recited in claim 1 wherein said first storage means is a CD ROM.]

[9. An electronic gaming system as recited in claim 1 wherein said first storage means is a hard disk drive.]

[10. An electronic gaming system as recited in claim 1 wherein said first storage means comprises a network storage system which is remote from the electronic gaming system.]

[11. An electronic gaming system as recited in claim 1 wherein said second storage means comprises a network storage system which is remote from the electronic gaming system.]

[12. An electronic gaming system as recited in claim 1 wherein said game data set is a game-modifying data set for changing game rules parameters of the casino type game.]

[13. An electronic gaming system as recited in claim 12 wherein said game-modifying data set includes a money handler modifying data set for changing money handling parameters of the casino type game.]

[14. An electronic gaming system as recited in claim 12 wherein said game-modifying data sets include a graphics modifying data set for changing graphics parameters of the casino type game.]

[15. An electronic gaming system as recited in claim 12 wherein said game-modifying data sets include a sound driver modifying data set for changing sound parameters of the casino type game.]

*16. A casino gaming apparatus comprising:*

*a casino game console;*

*a video display unit;*

*a first memory providing an executable space for a processor disposed in said casino game console;*

*a second memory, disposed in said casino game console, operable to store gaming data relating to a plurality of different casino games, the gaming data relating to a plurality of casino game variations or combinations thereof;*

*a third memory, being disposed in said casino game console, storing system logic for reading files in a file system stored on the second memory wherein the system logic is authenticated prior to authenticating the gaming data relating to the plurality of different casino games;*

*a nonvolatile memory disposed in said casino game console operable to store gaming data relating to the play of the plurality of different casino games or relating to the play of the plurality of casino game variations; and*

*the processor disposed in said casino game console and being operatively coupled to said video display unit, said first memory, said second memory, said third memory and said nonvolatile memory,*

*said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.*

*17. The casino gaming apparatus as defined in claim 16 wherein the gaming data relating to the play of the plurality of different casino games or relating to the play of the plurality of casino game variations stored in the non-volatile memory includes an outcome to a casino game previously played on the casino game console.*

*18. The casino gaming apparatus as defined in claim 16 wherein the system logic is a function of an operating system executed on the casino game console.*

*19. The casino gaming apparatus as defined in claim 16 wherein said second memory comprises an optical disk.*

*20. The casino gaming apparatus as defined in claim 16 further comprising at least one peripheral device coupled to the gaming console including a memory device wherein the processor is operable to authenticate contents of the memory device.*

*21. The casino gaming apparatus as defined in claim 16 wherein the second memory comprises a magnetic hard disk.*

*22. The casino gaming apparatus as defined in claim 16 wherein said second memory is operable as a read-only memory.*

*23. The casino gaming apparatus as defined in claim 16 wherein the second memory is disposed in said casino game console.*

*24. The casino gaming apparatus as defined in claim 16 wherein the second memory is disposed in a remote location separate from said casino game console.*

*25. The casino gaming apparatus as defined in claim 16 wherein the nonvolatile memory is disposed in said casino game console.*

*26. The casino gaming apparatus as defined in claim 16 wherein the nonvolatile memory is disposed in a remote location separate from said casino game console.*

*27. The casino gaming apparatus as defined in claim 16 wherein the video display unit is disposed in a remote location separate from said casino game console.*

*28. The casino gaming apparatus as defined in claim 16 further comprising a video subsystem, operatively coupled to the video display unit and operatively coupled to the processor, adapted for displaying still images, motion video or combinations thereof.*

*29. The casino gaming apparatus as defined in claim 16 wherein the processor is operable to generate a game play of the plurality of different casino games, the plurality of casino game variations or the combinations thereof.*

*30. The casino gaming apparatus as defined in claim 16 wherein in response to receiving a selection of a first casino game from the plurality of different casino games, the plurality of casino game variations or the combinations thereof, the casino gaming apparatus is operable to generate a play of the first casino game on the casino gaming apparatus.*

*31. The casino gaming apparatus as defined in claim 16 further comprising a sound-generating apparatus operatively coupled to the processor.*

*32. The casino gaming apparatus as defined in claim 16 further comprising a network interface wherein the network interface is designed to provide a wired connection or a wireless connection to a network.*

*33. A casino gaming apparatus comprising:*

*a casino game console;*

*a video display unit;*

*a first memory, providing an executable space for a processor, disposed in said casino game console;*

*a second memory disposed in said casino game console, said second memory storing gaming data related to a casino game;*

*a third memory storing an operating system, said third memory being disposed in said casino game console, wherein the operating system is enabled to control access to the second memory and wherein the operating system is authenticated prior to an authentication of the gaming data relating to the casino game stored on the second memory;*

*a network interface coupled to the casino game console for connecting to a network; and*

*the processor disposed in said casino game console and being operatively coupled to said video display unit, said first memory, said second memory, said third memory and the network interface;*

*said processor operable to transfer gaming data relating to a second casino game from a remote storage device connected to the network to a memory disposed on the gaming console;*

*said processor operable to cause said transferred gaming data relating to the second casino game to be checked based on at least a comparison of a first hash value generated from said transferred gaming data with a second hash value generated from known gaming data, and*

*said processor operable to cause a remedial action to be taken based on said check performed by said processor.*

*34. The casino gaming apparatus as defined in claim 33 wherein the operating system is adapted for reading files on a file system stored on the second memory.*

*35. The casino gaming apparatus as defined in claim 33 wherein said second memory comprises an optical disk.*

*36. The casino gaming apparatus as defined in claim 33 further comprising at least one peripheral device coupled to the gaming console including a memory device wherein the processor is operable to authenticate contents of the memory device.*

*37. The casino gaming apparatus as defined in claim 33 wherein said second memory comprises a magnetic hard disk.*

*38. The casino gaming apparatus as defined in claim 33 wherein said second memory is operable as a read-only memory.*

*39. The casino gaming apparatus as defined in claim 33 wherein the second memory is disposed in said casino game console.*

*40. The casino gaming apparatus as defined in claim 33 wherein the second memory is disposed in a remote location separate from said casino game console.*

*41. The casino gaming apparatus as defined in claim 33 further comprising a nonvolatile memory operable to store gaming data relating to the play of the casino game.*

*42. The casino gaming apparatus as defined in claim 41 wherein the nonvolatile memory is disposed in said casino game console.*

*43. The casino gaming apparatus as defined in claim 41 wherein the nonvolatile memory is disposed in a remote location separate from said casino game console.*

*44. The casino gaming apparatus as defined in claim 33 wherein the video display unit is disposed in a remote location separate from said casino game console.*

*45. The casino gaming apparatus as defined in claim 33 further comprising a video subsystem, operatively coupled to the video display unit and operatively coupled to the processor, adapted for displaying still images, motion video or combinations thereof.*

*46. The casino gaming apparatus as defined in claim 33 wherein the processor is operable to generate a game play of a plurality of different casino games.*

*47. The casino gaming apparatus as defined in claim 33 wherein in response to receiving a selection of a first casino game from a plurality of different casino games, the casino gaming apparatus is operable to generate a play of the first casino game on the casino gaming apparatus.*

*48. The casino gaming apparatus as defined in claim 33 further comprising a sound-generating apparatus operatively coupled to the processor.*

*49. The casino gaming apparatus as defined in claim 33 further comprising a network interface wherein the network interface is designed to provide a wired connection or a wireless connection to a network.*

*50. A casino gaming apparatus comprising:*

*a casino game console;*

*a video display unit;*

*a first memory providing an executable space for a processor disposed in said casino game console;*

*a second memory disposed in said casino game console, said second memory storing gaming data related to a casino game;*

*a third memory storing an operating system enabled to control a loading of the gaming data related to the casino game from the first memory to the second memory wherein the operating system is authenticated prior to an authentication of the gaming data related to the casino game; and*

*the processor disposed in said casino game console and being operatively coupled to said video display unit, said first memory, said second memory, and the third memory;*

*said processor operable to cause an authentication of the operating system or the gaming data related to the casino game using one-way hashing functions; and*

*said processor operable to cause a remedial action to be taken based on said authentication.*

*51. The casino gaming apparatus as defined in claim 50 wherein the operating system is adapted for reading files on a file system stored on the second memory.*

*52. The casino gaming apparatus as defined in claim 50 wherein said second memory comprises an optical disk.*

*53. The casino gaming apparatus as defined in claim 50 further comprising at least one peripheral device coupled to the gaming console including a memory device wherein the processor is operable to authenticate contents of the memory device.*

*54. The casino gaming apparatus as defined in claim 50 wherein said second memory comprises a magnetic hard disk.*

*55. The casino gaming apparatus as defined in claim 50 wherein said second memory is operable as a read-only memory.*

*56. The casino gaming apparatus as defined in claim 50 wherein the second memory is disposed in said casino game console.*

*57. The casino gaming apparatus as defined in claim 50 wherein the second memory is disposed in a remote location separate from said casino game console.*

*58. The casino gaming apparatus as defined in claim 50 further comprising a nonvolatile memory operable to store gaming data relating to the play of the casino game.*

*59. The casino gaming apparatus as defined in claim 58 wherein the nonvolatile memory is disposed in said casino game console.*

*60. The casino gaming apparatus as defined in claim 58 wherein the nonvolatile memory is disposed in a remote location separate from said casino game console.*

*61. The casino gaming apparatus as defined in claim 50 wherein the video display unit is disposed in a remote location separate from said casino game console.*

*62. The casino gaming apparatus as defined in claim 50 further comprising a video subsystem, operatively coupled to the video display unit and operatively coupled to the processor, adapted for displaying still images, motion video or combinations thereof.*

*63. The casino gaming apparatus as defined in claim 50 wherein the processor is operable to generate a game play of a plurality of different casino games.*

*64. The casino gaming apparatus as defined in claim 50 wherein in response to receiving a selection of a first casino game from a plurality of different casino games, the casino gaming apparatus is operable to generate a play of the first casino game on the casino gaming apparatus.*

*65. The casino gaming apparatus as defined in claim 50 further comprising a sound-generating apparatus operatively coupled to the processor.*

*66. The casino gaming apparatus as defined in claim 50 wherein the network interface is designed to provide a wired connection or a wireless connection to the network.*

*67. A casino gaming apparatus comprising:*

*a casino game console;*

*a video display unit;*

*a first memory providing an executable space for a processor disposed in said casino game console;*

*a second memory disposed in said casino game console, said second memory having gaming data relating to a casino game stored therein;*

*a third memory, being disposed in said casino game console, storing system logic for reading files in a file system stored on the second memory;*

*the processor disposed in said casino game console and being operatively coupled to said video display unit, said first memory, said second memory, and said third memory;*

*said processor operable to i) cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;*

*wherein the system logic is authenticated prior to authenticating the gaming data relating to the casino game stored on the second memory.*

*68. The casino gaming apparatus as defined in claim 67 wherein the system logic is a component of an operating system.*

*69. The casino gaming apparatus as defined in claim 67 wherein said second memory comprises an optical disk.*

*70. The casino gaming apparatus as defined in claim 67 further comprising at least one peripheral device coupled to the gaming console including a memory device wherein the processor is operable to authenticate contents of the memory device.*

*71. The casino gaming apparatus as defined in claim 67 wherein said second memory comprises a magnetic hard disk.*

*72. The casino gaming apparatus as defined in claim 67 wherein said second memory is operable as a read-only memory.*

*73. The casino gaming apparatus as defined in claim 67 wherein the second memory is disposed in said casino game console.*

*74. The casino gaming apparatus as defined in claim 67 wherein the second memory is disposed in a remote location separate from said casino game console.*

*75. The casino gaming apparatus as defined in claim 67 further comprising a nonvolatile memory operable to store gaming data relating to the play of the casino game.*

*76. The casino gaming apparatus as defined in claim 75 wherein the nonvolatile memory is disposed in said casino game console.*

*77. The casino gaming apparatus as defined in claim 75 wherein the nonvolatile memory is disposed in a remote location separate from said casino game console.*

*78. The casino gaming apparatus as defined in claim 67 wherein the video display unit is disposed in a remote location separate from said casino game console.*

*79. The casino gaming apparatus as defined in claim 67 further comprising a video subsystem, operatively coupled to the video display unit and operatively coupled to the processor, adapted for displaying still images, motion video or combinations thereof.*

*80. The casino gaming apparatus as defined in claim 67 wherein the processor is operable to generate a game play of a plurality of different casino games.*

*81. The casino gaming apparatus as defined in claim 67 wherein in response to receiving a selection of a first casino game from a plurality of different casino games, the casino gaming apparatus is operable to generate a play of the first casino game on the casino gaming apparatus.*

*82. The casino gaming apparatus as defined in claim 67 further comprising a sound-generating apparatus operatively coupled to the processor.*

*83. The casino gaming apparatus as defined in claim 67 further comprising a network interface wherein the network interface is designed to provide a wired connection or a wireless connection to a network.*

* * * * *

UNITED STATES PATENT AND TRADEMARK OFFICE

CERTIFICATE OF CORRECTION

PATENT NO. : RE 39,369 E
APPLICATION NO. : 10/224699
DATED : October 31, 2006
INVENTOR(S) : Alcorn et al.

It is certified that error appears in the above-identified patent and that said Letters Patent is hereby corrected as shown below:

In the Claims:

In line 5 of claim 67 (column 17, line 16) delete “disposed”.

Signed and Sealed this

Twenty-seventh Day of November, 2007

JON W. DUDAS
*Director of the United States Patent and Trademark Office*

UNITED STATES PATENT AND TRADEMARK OFFICE

CERTIFICATE OF CORRECTION

PATENT NO. : RE39,369 E
APPLICATION NO. : 90/008869
DATED : May 19, 2009
INVENTOR(S) : Allan E. Alcorn et al.

It is certified that error appears in the above-identified patent and that said Letters Patent is hereby corrected as shown below:

On the reexamination certificate title page, the listed assignee (field 73) "Silicon Gaming, Inc., Palo Alto, CA (US)" should be changed to --IGT, Reno, NV (US)--.

In column 11, line 14 (claim 169), the text --169.-- should be added at the start of the line.

In col. 14, line 55 (claim 210); col. 16, line 19 (claim 226); col. 17, line 53 (claim 243); col. 19, line 19 (claim 260); col. 20, line 54 (claim 277), the text "further comprising a network interface" should be deleted.

In col. 14, line 57 (claim 210); col. 16, line 21 (claim 226); col. 17, line 55 (claim 243); col. 19, line 21 (claim 260); col. 20, line 56 (claim 277), the text "to a network" should be changed to --to the network--.

In col. 17, line 44 (claim 241), replace "the" with --in--.

In col. 23, line 17 (claim 307); col. 24, line 36 (claim 323); col. 25, line 54 (claim 339); and col. 27, line 5 (claim 355), insert --further comprising a network interface-- between "293" and "wherein.".

In col. 23, line 18 (claim 307); col. 24, line 37 (claim 323); col. 25, line 55 (claim 339); and col. 27, line 6 (claim 355), replace "the" with --a--.

In col. 20, line 37, "comprisng" should be replaced with --comprising--.

In col. 26, line 50, "futher" should be replaced with --further--.

Signed and Sealed this
Twenty-first Day of February, 2012

David J. Kappos

David J. Kappos
*Director of the United States Patent and Trademark Office*

UNITED STATES PATENT AND TRADEMARK OFFICE

CERTIFICATE OF CORRECTION

PATENT NO. : RE39,369 E
APPLICATION NO. : 90/008868
DATED : May 19, 2009
INVENTOR(S) : Allan E. Alcorn et al.

It is certified that error appears in the above-identified patent and that said Letters Patent is hereby corrected as shown below:

On the reexamination certificate title page, the listed assignee (field 73) "Silicon Gaming, Inc., Palo Alto, CA (US)" should be changed to --IGT, Reno, NV (US)--.

In column 11, line 14 (claim 169), the text --169.-- should be added at the start of the line.

In col. 14, line 55 (claim 210); col. 16, line 19 (claim 226); col. 17, line 53 (claim 243); col. 19, line 19 (claim 260); col. 20, line 54 (claim 277), the text "further comprising a network interface" should be deleted.

In col. 14, line 57 (claim 210); col. 16, line 21 (claim 226); col. 17, line 55 (claim 243); col. 19, line 21 (claim 260); col. 20, line 56 (claim 277), the text "to a network" should be changed to --to the network--.

In col. 17, line 44 (claim 241), replace "the" with --in--.

In col. 23, line 17 (claim 307); col. 24, line 36 (claim 323); col. 25, line 54 (claim 339); and col. 27, line 5 (claim 355), insert --further comprising a network interface-- between "293" and "wherein.".

In col. 23, line 18 (claim 307); col. 24, line 37 (claim 323); col. 25, line 55 (claim 339); and col. 27, line 6 (claim 355), replace "the" with --a--.

In col. 20, line 37, "comprisng" should be replaced with --comprising--.

In col. 26, line 50, "futher" should be replaced with --further--.

This certificate supersedes the Certificate of Correction issued February 21, 2012.

Signed and Sealed this
Sixteenth Day of October, 2012

David J. Kappos

David J. Kappos
*Director of the United States Patent and Trademark Office*

US00RE39369F1

(12) EX PARTE REEXAMINATION CERTIFICATE (6822nd)

United States Patent

Alcorn et al.

(10) Number: US RE39,369 F1

(45) Certificate Issued: *May 19, 2009

(54) ELECTRONIC CASINO GAMING SYSTEM WITH IMPROVED PLAY CAPACITY, AUTHENTICATION AND SECURITY

(75) Inventors: Allan E. Alcorn, Portola Valley, CA (US); Michael Barnett, San Carlos, CA (US); Louis D. Giacalone, Jr., Henderson, NV (US); Adam E. Levinthal, Redwood City, CA (US)

(73) Assignee: Silicon Gaming, Inc., Palo Alto, CA (US)

Reexamination Request:
No. 90/008,868, Oct. 12, 2007

Reexamination Certificate for:

| | |
|---|---|
| Patent No.: | **Re. 39,369** |
| Issued: | **Oct. 31, 2006** |
| Appl. No.: | **10/224,699** |
| Filed: | **Aug. 21, 2002** |

( * ) Notice: This patent is subject to a terminal disclaimer.

Certificate of Correction issued Nov. 27, 2007.

(22) PCT Filed: Jun. 17, 1996

(86) PCT No.: PCT/US96/01463

§ 371 (c)(1), (2), (4) Date: Mar. 10, 1998

(87) PCT Pub. No.: WO97/01902

PCT Pub. Date: Jan. 16, 1997

Related U.S. Patent Documents

Reissue of:

(64) Patent No.: 6,106,396
Issued: Aug. 22, 2000
Appl. No.: 08/981,882
Filed: Mar. 10, 1998

U.S. Applications:

(63) Continuation-in-part of application No. 08/497,662, filed on Jun. 29, 1995, now Pat. No. 5,643,086.

(51) Int. Cl.
*A63F 13/00* (2006.01)
*G06F 5/00* (2006.01)

(52) U.S. Cl. ..... 463/29

(58) Field of Classification Search ..... None
See application file for complete search history.

(56) References Cited

U.S. PATENT DOCUMENTS 3,825,905 A 7/1974 Allen, Jr.

(Continued)

FOREIGN PATENT DOCUMENTS

EP 0 685 246 12/1995

(Continued)

OTHER PUBLICATIONS

Davida, G. et al., "Defending Systems Against Viruses through Cryptographic Authentication," Proceedings of the Symposium on Security and Privacy, *IEEE Comp. Soc. Press*, pp. 312–318 (May 1–3, 1989) XP000041247.

(Continued)

*Primary Examiner*—Peter C. English

(57) ABSTRACT

The electronic casino gaming system consists of several system components, including a microprocessor (12), a main memory unit (13) that is typically a random access memory, and a system boot ROM (14). Also included in the electronic casino gaming system are a non-volatile RAM (17), a mass storage unit (18), a disk susbystem (19), and a PCI bus (20). The disk subsystem (19) preferably supports SCSI-2 with options of fast and wide. A video subsystem (22) is also included in the electronic casino gaming system and is coupled to the PCI bus (20) to provide full color still images and MPEG movies.

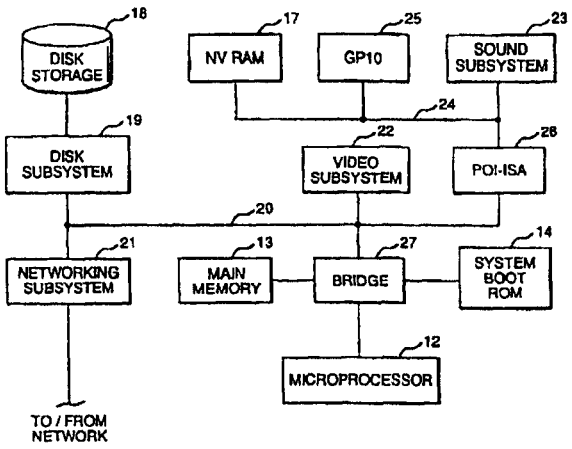

U.S. PATENT DOCUMENTS

| | | | |
|---|---|---|---|
| 3,838,264 | A | 9/1974 | Maker |
| 4,193,131 | A | 3/1980 | Lennon et al. |
| 4,200,770 | A | 4/1980 | Hellman et al. |
| 4,218,582 | A | 8/1980 | Hellman et al. |
| 4,354,251 | A | 10/1982 | Hellwig et al. |
| 4,355,390 | A | 10/1982 | Hellwig et al. |
| 4,405,829 | A | 9/1983 | Rivest et al. |
| 4,458,315 | A | 7/1984 | Uchenick |
| 4,462,076 | A | 7/1984 | Smith, III |
| 4,467,424 | A | 8/1984 | Hedges et al. |
| 4,494,114 | A | 1/1985 | Kaish |
| 4,519,077 | A | 5/1985 | Amin |
| 4,525,599 | A | 6/1985 | Curran et al. |
| 4,582,324 | A | 4/1986 | Koza et al. |
| 4,607,844 | A | 8/1986 | Fullerton |
| 4,652,998 | A | 3/1987 | Koza et al. |
| 4,658,093 | A | 4/1987 | Hellman |
| 4,727,544 | A | 2/1988 | Brunner et al. |
| 4,752,068 | A | 6/1988 | Endo |
| 4,759,064 | A | 7/1988 | Chaum |
| 4,817,140 | A | 3/1989 | Chandra et al. |
| 4,837,728 | A | 6/1989 | Barrie et al. |
| 4,845,715 | A | 7/1989 | Francisco |
| 4,848,744 | A | 7/1989 | Steininger et al. |
| 4,856,787 | A | 8/1989 | Itkis |
| 4,865,321 | A | 9/1989 | Nakagawa et al. |
| 4,911,449 | A | 3/1990 | Dickinson et al. |
| 4,930,073 | A | 5/1990 | Cina, Jr. |
| 4,944,008 | A | 7/1990 | Piosenka et al. |
| 4,951,149 | A | 8/1990 | Faroudja |
| 5,004,232 | A | 4/1991 | Wong et al. |
| 5,021,772 | A | 6/1991 | King et al. |
| 5,050,212 | A | 9/1991 | Dyson |
| 5,103,081 | A | 4/1992 | Fisher et al. |
| 5,109,152 | A | 4/1992 | Takagi et al. |
| 5,146,575 | A | 9/1992 | Nolan |
| 5,155,680 | A | 10/1992 | Wiedener |
| 5,155,768 | A | 10/1992 | Matsuhara |
| 5,161,193 | A | 11/1992 | Lampson et al. |
| 5,179,517 | A | 1/1993 | Sarbin et al. |
| 5,224,160 | A | 6/1993 | Paulini et al. |
| 5,235,642 | A | 8/1993 | Wobber et al. |
| 5,259,613 | A | 11/1993 | Marnell |
| 5,283,734 | A | 2/1994 | Von Kohorn |
| 5,288,978 | A | 2/1994 | Iijima |
| 5,291,585 | A | 3/1994 | Sato et al. |
| 5,297,205 | A | 3/1994 | Audebert et al. |
| 5,326,104 | A | 7/1994 | Pease et al. |
| 5,342,047 | A | 8/1994 | Heidel et al. |
| 5,343,527 | A | 8/1994 | Moore |
| 5,398,932 | A | 3/1995 | Eberhardt et al. |
| 5,421,006 | A | 5/1995 | Jablon et al. |
| 5,465,364 | A | 11/1995 | Lathrop et al. |
| 5,488,702 | A | 1/1996 | Byers et al. |
| 5,489,095 | A | 2/1996 | Goudard et al. |
| 5,507,489 | A | 4/1996 | Reibel et al. |
| 5,586,766 | A | 12/1996 | Forte et al. |
| 5,586,937 | A | 12/1996 | Menashe |
| 5,604,801 | A | 2/1997 | Dolan et al. |
| 5,611,730 | A | 3/1997 | Weiss |
| 5,643,086 | A | 7/1997 | Alcorn et al. |
| 5,644,704 | A | 7/1997 | Pease et al. |
| 5,655,965 | A | 8/1997 | Takemoto et al. |
| 5,668,945 | A | 9/1997 | Ohba et al. |
| 5,704,835 | A | 1/1998 | Dietz, II |
| 5,707,286 | A | 1/1998 | Carlson |
| 5,725,428 | A | 3/1998 | Achmuller |
| 5,737,418 | A | 4/1998 | Saffari et al. |
| 5,742,616 | A | 4/1998 | Torreiter et al. |
| 5,759,102 | A | 6/1998 | Pease et al. |
| 5,768,382 | A | 6/1998 | Schneier et al. |
| 5,800,264 | A | 9/1998 | Pascal et al. |
| 5,934,672 | A | 8/1999 | Sines et al. |
| 5,991,399 | A | 11/1999 | Graunke et al. |
| 6,071,190 | A | 6/2000 | Weiss et al. |
| 6,104,815 | A | 8/2000 | Alcorn et al. |
| 6,106,396 | A | 8/2000 | Alcorn et al. |
| 6,149,522 | A | 11/2000 | Alcorn et al. |
| 6,195,587 | B1 | 2/2001 | Hruska et al. |
| 6,620,047 | B1 | 9/2003 | Alcorn et al. |
| 6,851,607 | B2 | 2/2005 | Orus et al. |
| 2004/0002381 | A1 | 1/2004 | Alcorn et al. |

FOREIGN PATENT DOCUMENTS

| | | |
|---|---|---|
| EP | 1 352 677 | 10/2003 |
| EP | 1 441 464 | 7/2004 |
| GB | 2121569 | 7/1983 |
| GB | 2 121 569 | 12/1983 |
| JP | 1-120654 | 5/1989 |
| JP | 4-163627 | 6/1992 |
| JP | 6-327831 | 11/1994 |
| JP | 7-31737 | 2/1995 |
| JP | 7-129207 | 5/1995 |
| WO | WO 99/65579 | 12/1999 |
| WO | WO 00/33196 | 6/2000 |

OTHER PUBLICATIONS

Document entitled "Fact Sheet on Digital Signature Standard" dated May 1994, 6 pages.

Federal Information Processing Standards (FIPS) Publication 180–1 entitled "Secure Hash Standard" dated Apr. 17, 1995, 2 title pages, abstract page and pp. 1–21.

Federal Information Processing Standards (FIPS) Publication 180 entitled "Secure Hash Standard" dated May 11, 1993, title page, abstract page and pp. 1–20.

Federal Information Processing Standards (FIPS) Publication 186 entitled "Digital Signature Standard (DSS)" dated May 19, 1994, 17 pages.

Hellman, Martin E., "The Mathematics of Public–Key Cryptography," Scientific American, vol. 241, No. 8, Aug. 1979, pp. 146–152 and 154–157.

Rivest, et al., "A Method for Obtaining Digital Signatures and Public–Key Cryptosystems," Communications of the ACM, vol. 21, No. 2, Feb. 1978, pp. 120–126.

Bakhtiari et al., Cryptographic Hash Functions: A Survey, 1995, Centre for Computer Security Research, pp. 1–26.

Bauspiess, et al., "Requirements For Cryptographic Hash Functions," *Computers and Security*, 5:427–437 (Sep. 11, 1992).

Casino Journal of Nevada, Oct. 1996, pp. 64–66, 68–76,78, 82, 84, 86, 88, 90, 92, 94, 96 98, 145 and 146.

Levinthal, et al., "The Silicon Gaming Odyssey Slot Machine," IEEE published Feb. 23, 1997, pp. 296–301.

Gasser, Morrie; Le Roux, Yves; Lipner, Steve, The Digital Distributed System Security Architecture, Securicom 90, Mar. 14–16, 1990, 8th Worldwide Congress on Computer and Communications Security and Protection.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

Claims 1–15 were previously cancelled.

Claims 16, 20, 33, 36, 41, 50, 53, 58, 67, 70 and 75 are determined to be patentable as amended.

Claims 17–19, 21–32, 34, 35, 37–40, 42–49, 51, 52, 54–57, 59–66, 68, 69, 71–74 and 76–83, dependent on an amended claim, are determined to be patentable.

New claims 84–438 are added and determined to be patentable.

*16. A casino gaming apparatus comprising:*

*a casino game console;*

*a video display unit;*

*a first memory providing an executable space for a processor disposed in said casino game console;*

*a second memory, disposed in said casino game console, operable to store gaming data relating to a plurality of different casino games, the gaming data relating to a plurality of casino game variations or combinations thereof;*

*a third memory, being disposed in said casino game console, storing system logic for reading files in a file system stored on the second memory wherein the system logic is authenticated prior to authenticating the gaming data relating to the plurality of different casino games;* a fourth memory, coupled to the processor, configured to store a boot code for the casino gaming apparatus;

*a nonvolatile memory disposed in said casino game console operable to store gaming data relating to* [[the]] *play of the plurality of different casino games or relating to* [[the]] *play of the plurality of casino game variations; and*

*the processor disposed in said casino game console and being operatively coupled to said video display unit, said first memory, said second memory, said third memory and said nonvolatile memory,*

*said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.*

*20. The casino gaming apparatus as defined in claim 16 further comprising at least one peripheral device coupled to the* [[gaming]] casino game *console including a memory device wherein the processor is operable to authenticate contents of the memory device.*

*33. A casino gaming apparatus comprising:*

*a casino game console;*

*a video display unit;*

*a first memory, providing an executable space for a processor, disposed in said casino game console;*

*a second memory disposed in said casino game console, said second memory storing gaming data related to a casino game;*

*a third memory storing an operating system, said third memory being disposed in said casino game console, wherein the operating system is enabled to control access to the second memory and wherein the operating system is authenticated prior to an authentication of the gaming data relating to the casino game stored on the second memory;* a fourth memory, coupled to the processor, configured to store a boot code for the casino gaming apparatus;

*a network interface coupled to the casino game console for connecting to a network; and*

*the processor disposed in said casino game console and being operatively coupled to said video display unit, said first memory, said second memory, said third memory and the network interface;*

*said processor operable to transfer gaming data relating to a second casino game from a remote storage device connected to the network to a memory disposed on the* [[gaming]] casino game *console;*

*said processor operable to cause said transferred gaming data relating to the second casino game to be checked based on at least a comparison of a first hash value generated from said transferred gaming data with a second hash value generated from known gaming data, and*

*said processor operable to cause a remedial action to be taken based on said check performed by said processor.*

*36. The casino gaming apparatus as defined in claim 33 further comprising at least one peripheral device coupled to the* [[gaming]] casino game *console including a memory device wherein the processor is operable to authenticate contents of the memory device.*

*41. The casino gaming apparatus as defined in claim 33 further comprising a nonvolatile memory operable to store gaming data relating to* [[the]] *play of the casino game.*

*50. A casino gaming apparatus comprising:*

*a casino game console;*

*a video display unit;*

*a first memory providing an executable space for a processor disposed in said casino game console;*

*a second memory disposed in said casino game console, said second memory storing gaming data related to a casino game;*

*a third memory storing an operating system enabled to control a loading of the gaming data related to the casino game from the* [[first]] second *memory to the* [[second]] first *memory wherein the operating system is authenticated prior to an authentication of the gaming data related to the casino game;* a fourth memory, coupled to the processor, configured to store a boot code for the casino gaming apparatus; and

*the processor disposed in said casino game console and being operatively coupled to said video display unit, said first memory, said second memory, and the third memory;*

*said processor operable to cause an authentication of the operating system or the gaming data related to the casino game using one-way hashing functions; and*

*said processor operable to cause a remedial action to be taken based on said authentication.*

*53. The casino gaming apparatus as defined in claim 50 further comprising at least one peripheral device coupled to the* [[gaming]] casino game *console including a memory device wherein the processor is operable to authenticate contents of the memory device.*

*58. The casino gaming apparatus as defined in claim 50 further comprising a nonvolatile memory operable to store gaming data relating to* [[the]] *play of the casino game.*

*67. A casino gaming apparatus comprising:*

*a casino game console;*

*a video display unit;*

*a first memory providing an executable space for a processor in said casino game console;*

*a second memory disposed in said casino game console, said second memory having gaming data relating to a casino game stored therein;*

*a third memory, being disposed in said casino game console, storing system logic for reading files in a file system stored on the second memory;* a fourth memory, coupled to the processor, configured to store a boot code for the casino gaming apparatus;

*the processor disposed in said casino game console and being operatively coupled to said video display unit, said first memory, said second memory, and said third memory;*

*said processor operable to i) cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;*

*wherein the system logic is authenticated prior to authenticating the gaming data relating to the casino game stored on the second memory.*

*70. The casino gaming apparatus as defined in claim 67 further comprising at least one peripheral device coupled to the* [[gaming]] casino game *console including a memory device wherein the processor is operable to authenticate contents of the memory device.*

*75. The casino gaming apparatus as defined in claim 67 further comprising a nonvolatile memory operable to store gaming data relating to* [[the]] *play of the casino game.*

84. The casino gaming apparatus as defined in claim 16 wherein said processor is operable to send information relating to the authentication of the gaming data to a remote device.

85. The casino gaming apparatus as defined in claim 84 wherein said remote device is operated by a gaming regulator.

86. The casino gaming apparatus as defined in claim 16 wherein said processor is operable to display information relating to the authentication of the gaming data on the video display unit.

87. The casino gaming apparatus as defined in claim 16 wherein the third memory and the fourth memory are located on a same memory device.

88. The casino gaming apparatus as defined in claim 16, wherein the fourth memory is further configured to store a random number generator program used for generating outcomes for the plurality of different casino games, the plurality of casino game variations or the combinations thereof wherein the random number generator program is stored and authenticated separately from the gaming data.

89. The casino gaming apparatus as defined in claim 16, wherein, in response to an event generated while the casino gaming apparatus is available for game play, at least a portion of the gaming data is authenticated.

90. The casino gaming apparatus as defined in claim 16, wherein at least a portion of the gaming data is authenticated while the casino gaming apparatus is available for game play.

91. The casino gaming apparatus as defined in claim 33 wherein said processor is operable to send information relating to the authentication of the gaming data to a remote device.

92. The casino gaming apparatus as defined in claim 91 wherein said remote device is operated by a gaming regulator.

93. The casino gaming apparatus as defined in claim 33 wherein said processor is operable to display information relating to the authentication of the gaming data on the video display unit.

94. The casino gaming apparatus as defined in claim 33, wherein the third memory and the fourth memory are located on a same memory device.

95. The casino gaming apparatus as defined in claim 33, wherein the fourth memory is further configured to store a random number generator program used for generating outcomes for the casino game wherein the random number generator program is stored and authenticated separately from the gaming data.

96. The casino gaming apparatus as defined in claim 33, wherein, in response to an event generated while the casino gaming apparatus is available for game play, at least a portion of the gaming data is authenticated.

97. The casino gaming aparatus as defined in claim 33, wherein at least a portion of the gaming data is authenticated while the casino gaming apparatus is available for game play.

98. The casino gaming apparatus as defined in claim 50 wherein said processor is operable to send information relating to the authentication of the gaming data to a remote device.

99. The casino gaming apparatus as defined in claim 98 wherein said remote device is operated by a gaming regulator.

100. The casino gaming apparatus as defined in claim 50 wherein said processor is operable to display information relating to the authentication of the gaming data on the video display unit.

101. The casino gaming apparatus as defined in claim 50, wherein the third memory and the fourth memory are located on a same memory device.

102. The casino gaming apparatus as defined in claim 50, wherein the fourth memory is further configured to store a random number generator program used for generating outcomes for the casino game wherein the random number generator program is stored and authenticated separately from the gaming data.

103. The casino gaming apparatus as defined in claim 50, wherein, in response to an event generated while the casino gaming apparatus is available for game play, at least a portion of the gaming data is authenticated.

104. The casino gaming apparatus as defined in claim 50, wherein at least a portion of the gaming data is authenticated while the casino gaming apparatus is available for game play.

105. The casino gaming apparatus as defined in claim 67 wherein said processor is operable to send information relating to the authentication of the gaming data to a remote device.

106. The casino gaming apparatus as defined in claim 105 wherein said remote device is operated by a gaming regulator.

107. The casino gaming apparatus as defined in claim 67 wherein said processor is operable to display information relating to the authentication of the gaming data on the video display unit.

108. The casino gaming apparatus as defined in claim 67, wherein the third memory and the fourth memory are located on a same memory device.

109. The casino gaming apparatus as defined in claim 67, wherein the fourth memory is further configured to store a random number generator program used for generating outcomes for the casino game wherein the random number generator program is stored and authenticated separately from the gaming data.

110. The casino gaming apparatus as defined in claim 67, wherein, in response to an event generated while the casino gaming apparatus is available for game play, at least a portion of the gaming data is authenticated.

111. The casino gaming apparatus as defined in claim 67, wherein at least a portion of the gaming data is authenticated while the casino gaming apparatus is available for game play.

112. A casino gaming apparatus comprising:

a casino game console;

a video display unit;

a first memory providing an executable space for a processor disposed in said casino game console;

a second memory, disposed in said casino game console, operable to store gaming data relating to a plurality of different casino games, the gaming data relating to a plurality of casino game variations or combinations thereof;

a third memory, being disposed in said casino game console, storing system logic for reading files in a file system stored on the second memory wherein the system logic is authenticated prior to authenticating the gaming data relating to the plurality of different casino games;

a fourth memory configured to store a random number generator program used for generating outcomes for the plurality of different casino games, the plurality of casino game variations or the combinations thereof wherein the random number generator program is stored and authenticated separately from the gaming data;

a nonvolatile memory disposed in said casino game console operable to store gaming data relating to play of the plurality of different casino games or relating to play of the plurality of casino game variations; and the processor disposed in said casino game console and being operatively coupled to said video display unit, said first memory, said second memory, said third memory and said nonvolatile memory, said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.

113. The casino gaming aparatus as defined in claim 112 wherein said processor is operable to send information relating to the authentication of the gaming data to a remote device.

114. The casino gaming apparatus as defined in claim 112 wherein said processor is operable to display information relating to the authentication of the gaming data on the video display unit.

115. The casino gaming apparatus as defined in claim 112, wherein the third memory and the fourth memory are located on a same memory device.

116. The casino gaming apparatus as defined in claim 112, wherein the fourth memory is further configured to store a boot code for the casino gaming apparatus.

117. The casino gaming apparatus as defined in claim 112, wherein, in response to an event generated while the casino gaming apparatus is available for game play, at least a portion of the gaming data is authenticated.

118. The casino gaming apparatus as defined in claim 112, wherein at least a portion of the gaming data is authenticated while the casino gaming apparatus is available for game play.

119. The casino gaming apparatus as defined in claim 112 wherein the gaming data relating to the play of the plurality of different casino games or relating to the play of the plurality of casino game variations stored in the non-volatile memory includes an outcome to a casino game previously played on the casino game console.

120. The casino gaming apparatus as defined in claim 112 wherein the system logic is a function of an operating system executed on the casino game console.

121. The casino gaming apparatus as defined in claim 112 further comprising at least one peripheral device coupled to the casino game console including a memory device wherein the processor is operable to authenticate contents of the memory device.

122. The casino gaming apparatus as defined in claim 112 wherein the video display unit is disposed in a remote location separate from said casino game console.

123. The casino gaming apparatus as defined in claim 112 further comprising a video subsystem, operatively coupled to the video display unit and operatively coupled to the processor, adapted for displaying still images, motion video or combinations thereof.

124. The casino gaming apparatus as defined in claim 112 wherein the processor is operable to generate a game play of the plurality of different casino games, the plurality of casino game variations or the combinations thereof.

125. The casino gaming apparatus as defined in claim 112 wherein in response to receiving a selection of a first casino game from the plurality of different casino games, the plurality of casino game variations or the combinations thereof, the casino gaming apparatus is operable to generate a play of the first casino game on the casino gaming apparatus.

126. The casino gaming apparatus as defined in claim 112 further comprising a sound-generating apparatus operatively coupled to the processor.

127. The casino gaming apparatus as defined in claim 112 further comprising a network interface wherein the network interface is designed to provide a wired connection or a wireless connection to a network.

128. A casino gaming apparatus comprising:

a casino game console;

a video display unit;

a first memory providing an executable space for a processor disposed in said casino game console;

a second memory, disposed in said casino game console, operable to store gaming data relating to a plurality of different casino games, the gaming data relating to a plurality of casino game variations or combinations thereof;

a third memory, being disposed in said casino game console, storing system logic for reading files in a file system stored on the second memory wherein the system logic is authenticated prior to authenticating the gaming data relating to the plurality of different casino games;

wherein, in response to an event generated while the casino gaming apparatus is available for game play, at least a portion of the gaming data is authenticated;

a nonvolatile memory disposed in said casino game console operable to store gaming data relating to play of the plurality of different casino games or relating to play of the plurality of casino game variations; and the processor disposed in said casino game console and being operatively coupled to said video display unit, said first memory, said second memory, said third memory and said nonvolatile memory, said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.

129. The casino gaming apparatus as defined in claim 128 wherein said processor is operable to send information relating to the authentication of the gaming data to a remote device.

130. The casino gaming apparatus as defined in claim 128 wherein said processor is operable to display information relating to the authentication of the gaming data on the video display unit.

131. The casino gaming apparatus as defined in claim 128, wherein the second memory is operable as a read-only memory.

132. The casino gaming apparatus as defined in claim 128, wherein the second memory is disposed in a remote location separate from said casino game console.

133. The casino gaming apparatus as defined in claim 128, further comprising a fourth memory configured to store a random number generator program used for generating outcomes for the plurality of different casino games, the plurality of casino game variations or the combinations thereof wherein the random number generator program is stored and authenticated separately from the gaming data.

134. The casino gaming apparatus as defined in claim 128, further comprising a fourth memory, coupled to the processor, configured to store a boot code for the casino gaming apparatus.

135. The casino gaming apparatus as defined in claim 128 wherein the gaming data relating to the play of the plurality of different casino games or relating to the play of the plurality of casino game variations stored in the non-volatile memory includes an outcome to a casino game previously played on the casino game console.

136. The casino gaming apparatus as defined in claim 128 wherein the system logic is a function of an operating system executed on the casino game console.

137. The casino gaming apparatus as defined in claim 128 further comprising at least one peripheral device coupled to the casino game console including a memory device wherein the processor is operable to authenticate contents of the memory device.

138. The casino gaming apparatus as defined in claim 128 wherein the video display unit is disposed in a remote location separate from said casino game console.

139. The casino gaming apparatus as defined in claim 128 further comprising a video subsystem, operatively coupled to the video display unit and operatively coupled to the processor, adapted for displaying still images, motion video or combinations thereof.

140. The casino gaming apparatus as defined in claim 128 wherein the processor is operable to generate a game play of the plurality of different casino games, the plurality of casino game variations or the combinations thereof.

141. The casino gaming apparatus as defined in claim 128 wherein in response to receiving a selection of a first casino game from the plurality of different casino games, the plurality of casino game variations or the combinations thereof, the casino gaming apparatus is operable to generate a play of the first casino game on the casino gaming apparatus.

142. The casino gaming apparatus as defined in claim 128 further comprising a sound-generating apparatus operatively coupled to the processor.

143. The casino gaming apparatus as defined in claim 128 further comprising a network interface wherein the network interface is designed to provide a wired connection or a wireless connection to a network.

144. A casino gaming apparatus comprising:

a casino game console;

a video display unit;

a first memory providing an executable space for a processor disposed in said casino game console;

a second memory, disposed in said casino game console, operable to store gaming data relating to a plurality of different casino games, the gaming data relating to a plurality of casino game variations or combinations thereof;

a third memory, being disposed in said casino game console, storing system logic for reading files in a file system stored on the second memory wherein the system logic is authenticated prior to authenticating the gaming data relating to the plurality of different casino games;

wherein at least a portion of the gaming data is authenticated while the casino gaming apparatus is available for game play;

a nonvolatile memory disposed in said casino game console operable to store gaming data relating to play of the plurality of different casino games or relating to play of the plurality of casino game variations; and the processor disposed in said casino game console and being operatively coupled to said video display unit, said first memory, said second memory, said third memory and said nonvolatile memory, said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.

145. The casino gaming apparatus as defined in claim 144 wherein said processor is operable to send information relating to the authentication of the gaming data to a remote device.

146. The casino gaming apparatus as defined in claim 144 wherein said processor is operable to display information relating to the authentication of the gaming data on the video display unit.

147. The casino gaming apparatus as defined in claim 144, wherein the second memory is disposed in a remote location separate from said casino game console.

148. The casino gaming apparatus as defined in claim 144, wherein the second memory is operable as a read-only memory.

149. The casino gaming apparatus as defined in claim 144, further comprising a fourth memory configured to store a random number generator program used for generating outcomes for the plurality of different casino games, the plurality of casino game variations or the combinations thereof wherein the random number generator program is stored and authenticated separately from the gaming data.

150. The casino gaming apparatus as defined in claim 144, further comprising a fourth memory, coupled to the processor, configured to store a boot code for the casino gaming apparatus.

151. The casino gaming apparatus as defined in claim 144, wherein, in response to an event generated while the casino gaming apparatus is available for game play, at least a portion of the gaming data is authenticated.

152. The casino gaming apparatus as defined in claim 144 wherein the gaming data relating to the play of the plurality of different casino games or relating to the play of the plurality of casino game variations stored in the non-volatile memory includes an outcome to a casino game previously played on the casino game console.

153. The casino gaming apparatus as defined in claim 144 wherein the system logic is a function of an operating system executed on the casino game console.

154. The casino gaming apparatus as defined in claim 144 further comprising at least one peripheral device coupled to the casino game console including a memory device wherein the processor is operable to authenticate contents of the memory device.

155. The casino gaming apparatus as defined in claim 144 wherein the video display unit is disposed in a remote location separate from said casino game console.

156. The casino gaming apparatus as defined in claim 144 further comprising a video subsystem, operatively coupled to the video display unit and operatively coupled to the processor, adapted for displaying still images, motion video or combinations thereof.

157. The casino gaming apparatus as defined in claim 144 wherein the processor is operable to generate a game play of the plurality of different casino games, the plurality of casino game variations or the combinations thereof.

158. The casino gaming apparatus as defined in claim 144 wherein in response to receiving a selection of a first casino game from the plurality of different casino games, the plurality of casino game variations or the combinations thereof, the casino gaming apparatus is operable to generate a play of the first casino game on the casino gaming apparatus.

159. The casino gaming apparatus as defined in claim 144 further comprising a sound-generating apparatus operatively coupled to the processor.

160. The casino gaming apparatus as defined in claim 144 further comprising a network interface wherein the network interface is designed to provide a wired connection or a wireless connection to a network.

161. A casino gaming apparatus comprising:

a casino game console;

a video display unit;

a first memory providing an executable space for a processor disposed in said casino game console;

a second memory, disposed in said casino game console, operable to store gaming data relating to a plurality of different casino games, the gaming data relating to a plurality of casino game variations or combinations thereof;

a third memory, being disposed in said casino game console, storing system logic for reading files in a file system stored on the second memory wherein the system logic is authenticated prior to authenticating the gaming data relating to the plurality of different casino games;

at least one peripheral device coupled to the casino game console including a memory device wherein the processor is operable to authenticate contents of the memory device;

a nonvolatile memory disposed in said casino game console operable to store gaming data relating to play of the plurality of different casino games or relating to play of the plurality of casino game variations; and the processor disposed in said casino game console and being operatively coupled to said video display unit, said first memory, said second memory, said third memory and said nonvolatile memory, said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.

162. The casino gaming apparatus as defined in claim 161 wherein said processor is operable to send information relating to the authentication of the gaming data to a remote device.

163. The casino gaming apparatus as defined in claim 161 wherein said processor is operable to display information relating to the authentication of the gaming data on the video display unit.

164. The casino gaming apparatus as defined in claim 161, wherein the second memory is operable as a read-only memory.

165. The casino gaming apparatus as defined in claim 161, wherein the second memory is disposed in a remote location separate from said casino game console.

166. The casino gaming apparatus as defined in claim 161, further comprising a fourth memory configured to store a random number generator program used for generating outcomes for the plurality of different casino games, the plurality of casino game variations or the combinations thereof wherein the random number generator program is stored and authenticated separately from the gaming data.

167. The casino gaming apparatus as defined in claim 161, futher comprising a fourth memory, coupled to the processor, configured to store a boot code for the casino gaming apparatus.

168. The casino gaming apparatus as defined in claim 161, wherein, in response to an event generated while the casino gaming apparatus is available for game play, at least a portion of the gaming data is authenticated.

The casino gaming apparatus as defined in claim 161 wherein the gaming data relating to the play of the plurality of different casino games or relating to the play of the plurality of casino game variations stored in the nonvolatile memory includes an outcome to a casino game previously played on the casino game console.

170. The casino gaming apparatus as defined in claim 161 wherein the system logic is a function of an operating system executed on the casino game console.

171. The casino gaming apparatus as defined in claim 161 wherein at least a portion of the gaming data is authenticated while the casino gaming apparatus is available for game play.

172. The casino gaming apparatus as defined in claim 161 wherein the video display unit is disposed in a remote location separate from said casino game console.

173. The casino gaming apparatus as defined in claim 161 further comprising a video subsystem, operatively coupled to the video display unit and operatively coupled to the processor, adapted for displaying still images, motion video or combinations thereof.

174. The casino gaming apparatus as defined in claim 161 wherein the processor is operable to generate a game play of the plurality of different casino games, the plurality of casino game variations or the combinations thereof.

175. The casino gaming apparatus as defined in claim 161 wherein in response to receiving a selection of a first casino game from the plurality of different casino games, the plurality of casino game variations or the combinations thereof, the casino gaming apparatus is operable to generate a play of the first casino game on the casino gaming apparatus.

176. The casino gaming apparatus as defined in claim 161 further comprising a sound-generating apparatus operatively coupled to the processor.

177. The casino gaming apparatus as defined in claim 161 further comprising a network interface wherein the network interface is designed to provide a wired connection or a wireless connection to a network.

178. A casino gaming apparatus comprising:

a casino game console;

a video display unit wherein the video display unit is disposed in a remote location separate from said casino game console;

a first memory providing an executable space for a processor disposed in said casino game console;

a second memory, disposed in said casino game console, operable to store gaming data relating to a plurality of different casino games, the gaming data relating to a plurality of casino game variations or combinations thereof;

a third memory, being disposed in said casino game console, storing system logic for reading files in a file system stored on the second memory wherein the system logic is authenticated prior to authenticating the gaming data relating to the plurality of different casino games;

a nonvolatile memory disposed in said casino game console operable to store gaming data relating to play of the plurality of different casino games or relating to play of the plurality of casino game variations; and the processor disposed in said casino game console and being operatively coupled to said video display unit, said first memory, said second memory, said third memory and said nonvolatile memory, said processor operable to cause gaming data relating to the plurality of different casino games, the gaming data relating to the plurality of casino game variations or the combinations thereof, to be authenticated based on at least a comparison of a first hash value generated from the gaming data with a second hash value generated from known gaming data.

179. The casino gaming apparatus as defined in claim 178 wherein said processor is operable to send information relating to the authentication of the gaming data to a remote device.

180. The casino gaming apparatus as defined in claim 178 wherein said processor is operable to display information relating to the authentication of the gaming data on the video display unit.

181. The casino gaming apparatus as defined in claim 178, wherein the second memory is disposed in a remote location separate from said casino game console.

182. The casino gaming apparatus as defined in claim 178, wherein the second memory is operable as a read-only memory.

183. The casino gaming apparatus as defined in claim 178, further comprising a fourth memory configured to store a random number generator program used for generating outcomes for the plurality of different casino games, the plurality of casino game variations or the combinations thereof wherein the random number generator program is stored and authenticated separately from the gaming data.

184. The casino gaming apparatus as defined in claim 178, further comprising a fourth memory, coupled to the processor, configured to store a boot code for the casino gaming apparatus.

185. The casino gaming apparatus as defined in claim 178, wherein, in response to an event generated while the casino gaming apparatus is available for game play, at least a portion of the gaming data is authenticated.

186. The casino gaming apparatus as defined in claim 178 wherein the gaming data relating to the play of the plurality of different casino games or relating to the play of the plurality of casino game variations stored in the non-volatile memory includes an outcome to a casino game previously played on the casino game console.

187. The casino gaming apparatus as defined in claim 178 wherein the system logic is a function of an operating system executed on the casino game console.

188. The casino gaming apparatus as defined in claim 178 wherein at least a portion of the gaming data is authenticated while the casino gaming apparatus is available for game play.

189. The casino gaming apparatus as defined in claim 178 further comprising at least one peripheral device coupled to the casino game console including a memory device wherein the processor is operable to authenticate contents of the memory device.

190. The casino gaming apparatus as defined in claim 178 further comprising a video subsystem, operatively coupled to the video display unit and operatively coupled to the processor, adpated for displaying still images, motion video or combinations thereof.

191. The casino gaming apparatus as defined in claim 178 wherein the processor is operable to generate a game play of the plurality of different casino games, the plurality of casino game variations or the combinations thereof.

192. The casino gaming apparatus as defined in claim 178 wherein the response to receiving a selection of a first casino game from the plurality of different casino games, the plurality of casino game variations or the combinations thereof, the casino gaming apparatus is operable to generate a play of the first casino game on the casino gaming apparatus.

193. The casino gaming apparatus as defined in claim 178 further comprising a sound-generating apparatus operatively coupled to the processor.

194. The casino gaming apparatus as defined in claim 178 further comprising a network interface wherein the network interface is designed to provide a wired connection or a wireless connection to a network.

195. A casino gaming apparatus comprising:

a casino game console;

a video display unit;

a first memory, providing an executable space for a processor, disposed in said casino game console;

a second memory disposed in said casino game console, said second memory storing gaming data related to a casino game;

a third memory storing an operating system, said third memory being disposed in said casino game console, wherein the operating system is enabled to control access to the second memory and wherein the operating system is authenticated prior to an authentication of the gaming data relating to the casino game stored on the second memory;

a fourth memory configured to store a random number generator program used for generating outcomes for the casino game wherein the random number generator program is stored and authenticated separately from the gaming data;

a network interface coupled to the casino game console for connecting to a network; and the processor disposed in said casino game console and being operatively coupled to said video display unit, said first memory, said second memory, said third memory and the network interface;

said processor operable to transfer gaming data relating to a second casino game from a remote storage device connected to the network to a memory disposed on the casino game console;

said processor operable to cause said transferred gaming data relating to the second casino game to be checked based on at least a comparison of a first hash value generated from said transferred gaming data with a second hash value generated from known gaming data, and said processor operable to cause a remedial action to be taken based on said check performed by said processor.

196. The casino gaming apparatus as defined in claim 195 wherein said processor is operable to send information relating to the authentication of the gaming data to a remote device.

197. The casino gaming apparatus as defined in claim 195 wherein said processor is operable to display information relating to the authentication of the gaming data on the video display unit.

198. The casino gaming apparatus as defined in claim 195, wherein the third memory and the fourth memory are located on a same memory device.

199. The casino gaming apparatus as defined in claim 195, wherein the fourth memory is further configured to store a boot code for the casino gaming apparatus.

200. The casino gaming apparatus as defined in claim 195, wherein, in response to an event generated while the casino gaming apparatus is available for game play, at least a portion of the gaming data is authenticated.

201. The casino gaming apparatus as defined in claim 195, wherein at least a portion of the gaming data is authenticated while the casino gaming apparatus is available for game play.

202. The casino gaming apparatus as defined in claim 195 wherein the operating system is adapted for reading files on a file system stored on the second memory.

203. The casino gaming apparatus as defined in claim 195 further comprising at least one peripheral device coupled to the casino game console including a memory device wherein the processor is operable to authenticate contents of the memory device.

204. The casino gaming apparatus as defined in claim 195 further comprising a non-volatile memory operable to store gaming data relating to play of the casino game.

205. The casino gaming apparatus as defined in claim 195 wherein the video display unit is disposed in a remote location separate from said casino game console.

206. The casino gaming apparatus as defined in claim 195 further comprising a video subsystem, operatively coupled to the video display unit and operatively coupled to the processor, adapted for displaying still images, motion video or combinations thereof.

207. The casino gaming apparatus as defined in claim 195 wherein the processor is operable to generate a game play of a plurality of different casino games.

208. The casino gaming apparatus as defined in claim 195 wherein in response to receiving a selection of a first casino game from a plurality of different casino games, the casino gaming apparatus is operable to generate a play of the first casino game on the casino gaming apparatus.

209. The casino gaming apparatus as defined in claim 195 further comprising a sound-generating apparatus operatively coupled to the processor.

210. The casino gaming apparatus as defined in claim 195 further comprising a network interface wherein the network interface is designed to provide a wired connection or a wireless connection to a network.

211. A casino gaming apparatus comprising:

a casino game console;

a video display unit;

a first memory, providing an executable space for a processor, disposed in said casino game console;

a second memory disposed in said casino game console, said second memory storing gaming data related to a casino game;

a third memory storing an operating system, said third memory being disposed in said casino game console, wherein the operating system is enabled to control access to the second memory and wherein the operating system is authenticated prior to an authentication of the gaming data relating to the casino game stored on the second memory;

wherein, in response to an event generated while the casino gaming apparatus is available for game play, at least a portion of the gaming data is authenticated;

a network interface coupled to the casino game console for connecting to a network; and the processor disposed in said casino game console and being operatively coupled to said video display unit, said first memory, said second memory, said third memory and the network interface;

said processor operable to transfer gaming data relating to a second casino game from a remote storage device connected to the network to a memory disposed on the casino game console;

said processor operable to cause said transferred gaming data relating to the second casino game to be checked based on at least a comparison of a first hash value generated from said transferred gaming data with a second hash value generated from known gaming data, and said processor operable to cause a remedial action to be taken based on said check performed by said processor.

212. The casino gaming apparatus as defined in claim 211 wherein said processor is operable to send information relating to the authentication of the gaming data to a remote device.

213. The casino gaming apparatus as defined in claim 211 wherein said processor is operable to display information relating to the authentication of the gaming data on the video display unit.

214. The casino gaming apparatus as defined in claim 211, wherein the second memory is operable as a read-only memory.

215. The casino gaming apparatus as defined in claim 211, wherein the second memory is disposed in a remote location separate from said casino game console.

216. The casino gaming apparatus as defined in claim 211, further comprising a fourth memory configured to store a random number generator program used for generating outcomes for the casino game wherein the random number generator program is stored and authenticated separately from the gaming data.

217. The casino gaming apparatus as defined in claim 211, further comprising a fourth memory, coupled to the processor, configured to store a boot code for the casino gaming apparatus.

218. The casino gaming apparatus as defined in claim 211 wherein the operating system is adapted for reading files on a file system stored on the second memory.

219. The casino gaming apparatus as defined in claim 211 further comprising at least one peripheral device coupled to the casino game console including a memory device wherein the processor is operable to authenticate contents of the memory device.

220. The casino gaming apparatus as defined in claim 211 further comprising a non-volatile memory operable to store gaming data relating to play of the casino game.

221. The casino gaming apparatus as defined in claim 211 wherein the video display unit is disposed in a remote location separate from said casino game console.

222. The casino gaming apparatus as defined in claim 211 further comprising a video subsystem, operatively coupled to the video display unit and operatively coupled to the processor, adapted for displaying still images, motion video or combinations thereof.

223. The casino gaming apparatus as defined in claim 211 wherein the processor is operable to generate a game play of a plurality of different casino games.

224. The casino gaming apparatus as defined in claim 211 wherein in response to receiving a selection of a first casino game from a plurality of different casino games, the casino gaming apparatus is operable to generate a play of the first casino game on the casino gaming apparatus.

225. The casino gaming apparatus as defined in claim 211 further comprising a sound-generating apparatus operatively coupled to the processor.

226. The casino gaming apparatus as defined in claim 211 further comprising a network interface wherein the network interface is designed to provide a wired connection or a wireless connection to a network.

227. A casino gaming apparatus comprising:

a casino game console;

a video display unit;

a first memory, providing an executable space for a processor, disposed in said casino game console;

a second memory disposed in said casino game console, said second memory storing gaming data related to a casino game;

a third memory storing an operating system, said third memory being disposed in said casino game console, wherein the operating system is enabled to control access to the second memory and wherein the operating system is authenticated prior to an authentication of the gaming data relating to the casino game stored on the second memory;

wherein at least a portion of the gaming data is authenticated while the casino gaming apparatus is available for game play;

a network interface coupled to the casino game console for connecting to a network; and the processor disposed in said casino game console and being operatively coupled to said video display unit, said first memory, said second memory, said third memory and the network interface;

said processor operable to transfer gaming data relating to a second casino game from a remote storage device connected to the network to a memory disposed on the casino game console;

said processor operable to cause said transferred gaming data relating to the second casino game to be checked based on at least a comparison of a first hash value generated from said transferred gaming data with a second hash value generated from known gaming data, and said processor operable to cause a remedial action to be taken based on said check performed by said processor.

228. The casino gaming apparatus as defined in claim 227 wherein said processor is operable to send information relating to the authentication of the gaming data to a remote device.

229. The casino gaming apparatus as defined in claim 227 wherein said processor is operable to display information relating to the authentication of the gaming data on the video display unit.

230. The casino gaming apparatus as defined in claim 227, wherein the second memory is operable as a read-only memory.

231. The casino gaming apparatus as defined in claim 227, wherein the second memory is disposed in a remote location separate from said casino game console.

232. The casino gaming apparatus as defined in claim 227, further comprising a fourth memory configured to store a random number generator program used for generating outcomes for the casino game wherein the random number generator program is stored and authenticated separately from the gaming data.

233. The casino gaming apparatus as defined in claim 227, further comprising a fourth memory, coupled to the processor, configured to store a boot code for the casino gaming apparatus.

234. The casino gaming apparatus as defined in claim 227, wherein, in response to an event generated while the casino gaming apparatus is available for game play, at least a portion of the gaming data is authenticated.

235. The casino gaming apparatus as defined in claim 227 wherein the operating system is adapted for reading files on a file system stored on the second memory.

236. The casino gaming apparatus as defined in claim 227 further comprising at least one peripheral device coupled to the casino game console including a memory device wherein the processor is operable to authenticate contents of the memory device.

237. The casino gaming apparatus as defined in claim 227 further comprising a non-volatile memory operable to store gaming data relating to play of the casino game.

238. The casino gaming apparatus as defined in claim 227 wherein the video display unit is disposed in a remote location separate from said casino game console.

239. The casino gaming apparatus as defined in claim 227 further comprising a video subsystem, operatively coupled to the video display unit and operatively coupled to the processor, adapted for displaying still images, motion video or combinations thereof.

240. The casino gaming apparatus as defined in claim 227 wherein the processor is operable to generate a game play of a plurality of different casino games.

241. The casino gaming apparatus as defined in claim 227 wherein the response to receiving a selection of a first casino game from a plurality of different casino games, the casino gaming apparatus is operable to generate a play of the first casino game on the casino gaming apparatus.

242. The casino gaming apparatus as defined in claim 227 further comprising a sound-generating apparatus operatively coupled to the processor.

243. The casino gaming apparatus as defined in claim 227 further comprising a network interface wherein the network interface is designed to provide a wired connection or a wireless connection to a network.

244. A casino gaming apparatus comprising:

a casino game console;

a video display unit;

a first memory, providing an executable space for a processor, disposed in said casino game console;

a second memory disposed in said casino game console, said second memory storing gaming data related to a casino game;

a third memory storing an operating system, said third memory being disposed in said casino game console, wherein the operating system is enabled to control access to the second memory and wherein the operating system is authenticated prior to an authentication of the gaming data relating to the casino game stored on the second memory;

at least one peripheral device coupled to the casino game console including a memory device wherein the processor is operable to authenticate contents of the memory device;

a network interface coupled to the casino game console for connecting to a network; and the processor disposed in said casino game console and being operatively coupled to said video display unit, said first memory, said second memory, said third memory and the network interface;

said processor operable to transfer gaming data relating to a second casino game from a remote storage device connected to the network to a memory disposed on the casino game console;

said processor operable to cause said transferred gaming data relating to the second casino game to be checked based on at least a comparison of a first hash value generated from said transferred gaming data with a second hash value generated from known gaming data; and said processor operable to cause a remedial action to be taken based on said check performed by said processor.

245. The casino gaming apparatus as defined in claim 244 wherein said processor is operable to send information relating to the authentication of the gaming data to a remote device.

246. The casino gaming apparatus as defined in claim 244 wherein said processor is operable to display information relating to the authentication of the gaming data on the video display unit.

247. The casino gaming apparatus as defined in claim 244, wherein the second memory is operable as a read-only memory.

248. The casino gaming apparatus as defined in claim 244, wherein the second memory is disposed in a remote location separate from said casino game console.

249. The casino gaming apparatus as defined in claim 244, further comprising a fourth memory configured to store a random number generator program used for generating outcomes for the casino game wherein the random number generator program is stored and authenticated separately from the gaming data.

250. The casino gaming apparatus as defined in claim 244, further comprising a fourth memory, coupled to the processor, configured to store a boot code for the casino gaming apparatus.

251. The casino gaming apparatus as defined in claim 244, wherein, in response to an event generated while the casino gaming apparatus is available for game play, at least a portion of the gaming data is authenticated.

252. The casino gaming apparatus as defined in claim 244 wherein the operating system is adapted for reading files on a file system stored on the second memory.

253. The casino gaming apparatus as defined in claim 244 wherein at least a portion of the gaming data is authenticated while the casino gaming apparatus is available for game play.

254. The casino gaming apparatus as defined in claim 244 further comprising a non-volatile memory operable to store gaming data relating to play of the casino game.

255. The casino gaming apparatus as defined in claim 244 wherein the video display unit is disposed in a remote location separate from said casino game console.

256. The casino gaming apparatus as defined in claim 244 further comprising a video subsystem, operatively coupled to the video display unit and operatively coupled to the processor, adapted for displaying still images, motion video or combinations thereof.

257. The casino gaming apparatus as defined in claim 244 wherein the processor is operable to generate a game play of a plurality of different casino games.

258. The casino gaming apparatus as defined in claim 244 wherein in response to receiving a selection of a first casino game from a plurality of different casino games, the casino gaming apparatus is operable to generate a play of the first casino game on the casino gaming apparatus.

259. The casino gaming apparatus as defined in claim 244 further comprising a sound-generating apparatus operatively coupled to the processor.

260. The casino gaming apparatus as defined in claim 244 further comprising a network interface wherein the network interface is designed to provide a wired connection or a wireless connection to a network.

261. A casino gaming apparatus comprising:

a casino game console;

a video display unit wherein the video display unit is disposed in a remote location separate from said casino game console;

a first memory, providing an executable space for a processor, disposed in said casino game console;

a second memory disposed in said casino game console, said second memory storing gaming data related to a casino game;

a third memory storing an operating system, said third memory being disposed in said casino game console, wherein the operating system is enabled to control access to the second memory and wherein the operating system is authenticated prior to an authentication of the gaming data relating to the casino game stored on the second memory;

a network interface coupled to the casino game console for connecting to a network; and the processor disposed in said casino game console and being operatively coupled to said video display unit, said first memory, said second memory, said third memory and the network interface;

said processor operable to transfer gaming data relating to a second casino game from a remote storage device connected to the network to a memory disposed on the casino game console;

said processor operable to cause said transferred gaming data relating to the second casino game to be checked based on at least a comparison of a first hash value generated from said transferred gaming data with a second hash value generated from known gaming data, and said processor operable to cause a remedial action to be taken based on said check performed by said processor.

262. The casino gaming apparatus as defined in claim 261 wherein said processor is operable to send information relating to the authentication of the gaming data to a remote device.

263. The casino gaming apparatus as defined in claim 261 wherein said processor is operable to display information relating to the authentication of the gaming data on the video display unit.

264. The casino gaming apparatus as defined in claim 261, wherein the second memory is operable as a read-only memory.

265. The casino gaming apparatus as defined in claim 261, wherein the second memory is disposed in a remote location separate from said casino game console.

266. The casino gaming apparatus as defined in claim 261, further comprising a fourth memory configured to store a random number generator program used for generating outcomes for the casino game wherein the random number generator program is stored and authenticated separately from the gaming data.

267. The casino gaming apparatus as defined in claim 261, further comprising a fourth memory, coupled to the processor, configured to store a boot code for the casino gaming apparatus.

268. The casino gaming apparatus as defined in claim 261, wherein, in response to an event generated while the casino gaming apparatus is available for game play, at least a portion of the gaming data is authenticated.

269. The casino gaming apparatus as defined in claim 261 wherein the operating system is adapted for reading files on a file system stored on the second memory.

270. The casino gaming apparatus as defined in claim 261 wherein at least a portion of the gaming data is authenticated while the casino gaming apparatus is available for game play.

271. The casino gaming apparatus as defined in claim 261 further comprising a non-volatile memory operable to store gaming data relating to play of the casino game.

272. The casino gaming apparatus as defined in claim 261 further comprising at least one peripheral device coupled to the casino game console including a memory device wherein the processor is operable to authenticate contents of the memory device.

273. The casino gaming apparatus as defined in claim 261 further comprisng a video subsystem, operatively coupled to the video display unit and operatively coupled to the processor, adapted for displaying still images, motion video or combinations thereof.

274. The casino gaming apparatus as defined in claim 261 wherein the processor is operable to generate a game play of a plurality of different casino games.

275. The casino gaming apparatus as defined in claim 261 wherein in response to receiving a selection of a first casino game from a plurality of different casino games, the casino gaming apparatus is operable to generate a play of the first casino game on the casino gaming apparatus.

276. The casino gaming apparatus as defined in claim 261 further comprising a sound-generating apparatus operatively coupled to the processor.

277. The casino gaming apparatus as defined in claim 261 further comprising a network interface wherein the network interface is designed to provide a wired connection or a wireless connection to a network.

278. A casino gaming apparatus comprising:

a casino game console;

a video display unit;

a first memory providing an executable space for a processor disposed in said casino game console;

a second memory disposed in said casino game console, said second memory storing gaming data related to a casino game;

a third memory storing an operating system enabled to control a loading of the gaming data related to the casino game from the second memory to the first memory wherein the operating system is authenticated prior to an authentication of the gaming data related to the casino game;

a fourth memory configured to store a random number generator program used for generating outcomes for the casino game wherein the random number generator program is stored and authenticated separately from the gaming data; and the processor disposed in said casino game console and being operatively coupled to said video display unit, said first memory, said second memory, and the third memory;

said processor operable to cause an authentication of the operating system or the gaming data related to the casino game using one-way hashing functions; and said processor operable to cause a remedial action to be taken based on said authentication.

279. The casino gaming apparatus as defined in claim 278 wherein said processor is operable to send information relating to the authentication of the gaming data to a remote device.

280. The casino gaming apparatus as defined in claim 278 wherein said processor is operable to display information relating to the authentication of the gaming data on the video display unit.

281. The casino gaming apparatus as defined in claim 278, wherein the third memory and the fourth memory are located on a same memory device.

282. The casino gaming apparatus as defined in claim 278, wherein the fourth memory is further configured to store a boot code for the casino gaming apparatus.

283. The casino gaming apparatus as defined in claim 278, wherein, in response to an event generated while the casino gaming apparatus is available for game play, at least a portion of the gaming data is authenticated.

284. The casino gaming apparatus as defined in claim 278, wherein at least a portion of the gaming data is authenticated while the casino gaming apparatus is available for game play.

285. The casino gaming apparatus as defined in claim 278 further comprising at least one peripheral device coupled to the casino game console including a memory device wherein the processor is operable to authenticate contents of the memory device.

286. The casino gaming apparatus as defined in claim 278 further comprising a non-volatile memory operable to store gaming data relating to play of the casino game.

287. The casino gaming apparatus as defined in claim 278 wherein the video display unit is disposed in a remote location separate from said casino game console.

288. The casino gaming apparatus as defined in claim 278 further comprising a video subsystem, operatively coupled to the video display unit and operatively coupled to the processor, adapted for displaying still images, motion video or combinations thereof.

289. The casino gaming apparatus as defined in claim 278 wherein the processor is operable to generate a game play of a plurality of different casino games.

290. The casino gaming apparatus as defined in claim 278 wherein in response to receiving a selection of a first casino game from a plurality of different casino games, the casino gaming apparatus is operable to generate a play of the first casino game on the casino gaming apparatus.

291. The casino gaming apparatus as defined in claim 278 further comprising a sound-generating apparatus operatively coupled to the processor.

292. The casino gaming apparatus as defined in claim 278 wherein the network interface is designed to provide a wired connection or a wireless connection to the network.

293. A casino gaming apparatus comprising:

a casino game console;

a video display unit;

a first memory providing an executable space for a processor disposed in said casino game console;

a second memory disposed in said casino game console, said second memory storing gaming data related to a casino game;

a third memory storing an operating system enabled to control a loading of the gaming data related to the casino game from the second memory to the first memory wherein the operating system is authenticated prior to an authentication of the gaming data related to the casino game;

wherein, in response to an event generated while the casino gaming apparatus is available for game play, at least a portion of the gaming data is authenticated; and the processor disposed in said casino game console and being operatively coupled to said video display unit, said first memory, said second memory, and the third memory;

said processor operable to cause an authentication of the operating system or the gaming data related to the casino game using one-way hashing functions; and said processor operable to cause a remedial action to be taken based on said authentication.

294. The casino gaming apparatus as defined in claim 293 wherein said processor is operable to send information relating to the authentication of the gaming data to a remote device.

295. The casino gaming apparatus as defined in claim 293 wherein said processor is operable to display information relating to the authentication of the gaming data on the video display unit.

296. The casino gaming apparatus as defined in claim 293, wherein the second memory is disposed in a remote location separate from said casino game console.

297. The casino gaming apparatus as defined in claim 293, wherein the second memory is a read-only memory.

298. The casino gaming apparatus as defined in claim 293, further comprising a fourth memory configured to store a random number generator program used for generating outcomes for the casino game wherein the random number generator program is stored and authenticated separately from the gaming data.

299. The casino gaming apparatus as defined in claim 293, further comprising a fourth memory, coupled to the processor, configured to store a boot code for the casino gaming apparatus.

300. The casino gaming apparatus as defined in claim 293 further comprising at least one peripheral device coupled to the casino game console including a memory device wherein the processor is operable to authenticate contents of the memory device.

301. The casino gaming apparatus as defined in claim 293 further comprising a non-volatile memory operable to store gaming data relating to play of the casino game.

302. The casino gaming apparatus as defined in claim 293 wherein the video display unit is disposed in a remote location separate from said casino game console.

303. The casino gaming apparatus as defined in claim 293 further comprising a video subsystem, operatively coupled to the video display unit and operatively coupled to the processor, adapted for displaying still images, motion video or combinations thereof.

304. The casino gaming apparatus as defined in claim 293 wherein the processor is operable to generate a game play of a plurality of different casino games.

305. The casino gaming apparatus as defined in claim 293 wherein in response to receiving a selection of a first casino game from a plurality of different casino games, the casino gaming apparatus is operable to generate a play of the first casino game on the casino gaming apparatus.

306. The casino gaming apparatus as defined in claim 293 further comprising a sound-generating apparatus operatively coupled to the processor.

307. The casino gaming apparatus as defined in claim 293 wherein the network interface is designed to provide a wired connection or a wireless connection to the network.

308. A casino gaming apparatus comprising:

a casino game console;

a video display unit;

a first memory providing an executable space for a processor disposed in said casino game console;

a second memory disposed in said casino game console, said second memory storing gaming data related to a casino game;

a third memory storing an operating system enabled to control a loading of the gaming data related to the casino game from the second memory to the first memory wherein the operating system is authenticated prior to an authentication of the gaming data related to the casino game;

wherein at least a portion of the gaming data is authenticated while the casino gaming apparatus is available for game play; and the processor disposed in said casino game console and being operatively coupled to said video display unit, said first memory, said second memory, and the third memory;

said processor operable to cause an authentication of the operating system or the gaming data related to the casino game using one-way hashing functions; and said processor operable to cause a remedial action to be taken based on said authentication.

309. The casino gaming apparatus as defined in claim 308 wherein said processor is operable to send information relating to the authentication of the gaming data to a remote device.

310. The casino gaming apparatus as defined in claim 308 wherein said processor is operable to display information relating to the authentication of the gaming data on the video display unit.

311. The casino gaming apparatus as defined in claim 308, wherein the second memory is a read-only memory.

312. The casino gaming apparatus as defined in claim 308, wherein the second memory is disposed in a remote location separate from said casino game console.

313. The casino gaming apparatus as defined in claim 308, further comprising a fourth memory configured to store a random number generator program used for generating outcomes for the casino game wherein the random number generator program is stored and authenticated separately from the gaming data.

314. The casino gaming apparatus as defined in claim 308, further comprising a fourth memory, coupled to the processor, configured to store a boot code for the casino gaming apparatus.

315. The casino gaming apparatus as defined in claim 308, wherein, in response to an event generated while the casino gaming apparatus is available for game play, at least a portion of the gaming data is authenticated.

316. The casino gaming apparatus as defined in claim 308 further comprising at least one peripheral device coupled to the casino game console including a memory device wherein the processor is operable to authenticate contents of the memory device.

317. The casino gaming apparatus as defined in claim 308 further comprising a non-volatile memory operable to store gaming data relating to play of the casino game.

318. The casino gaming apparatus as defined in claim 308 wherein the video display unit is disposed in a remote location separate from said casino game console.

319. The casino gaming apparatus as defined in claim 308 further comprising a video subsystem, operatively coupled to the video display unit and operatively coupled to the processor, adapted for displaying still images, motion video or combinations thereof.

320. The casino gaming apparatus as defined in claim 308 wherein the processor is operable to generate a game play of a plurality of different casino games.

321. The casino gaming apparatus as defined in claim 308 wherein in response to receiving a selection of a first casino game from a plurality of different casino games, the casino gaming apparatus is operable to generate a play of the first casino game on the casino gaming apparatus.

322. The casino gaming apparatus as defined in claim 308 further comprising a sound-generating apparatus operatively coupled to the processor.

323. The casino gaming apparatus as defined in claim 308 wherein the network interface is designed to provide a wired connection or a wireless connection to the network.

324. A casino gaming apparatus comprising:

a casino game console;

a video display unit;

a first memory providing an executable space for a processor disposed in said casino game console;

a second memory disposed in said casino game console, said second memory storing gaming data related to a casino game;

a third memory storing an operating system enabled to control a loading of the gaming data related to the casino game from the second memory to the first memory wherein the operating system is authenticated prior to an authentication of the gaming data related to the casino game;

at least one peripheral device coupled to the casino game console including a memory device wherein the processor is operable to authenticate contents of the memory device; and the processor disposed in said casino game console and being operatively coupled to said video display unit, said first memory, said second memory, and the third memory;

said processor operable to cause an authentication of the operating system or the gaming data related to the casino game using one-way hashing functions; and said processor operable to cause a remedial action to be taken based on said authentication.

325. The casino gaming apparatus as defined in claim 324 wherein said processor is operable to send information relating to the authentication of the gaming data to a remote device.

326. The casino gaming apparatus as defined in claim 324 wherein said processor is operable to display information relating to the authentication of the gaming data on the video display unit.

327. The casino gaming apparatus as defined in claim 324, wherein the second memory is a read-only memory.

328. The casino gaming apparatus as defined in claim 324, wherein the second memory is disposed in a remote location separate from said casino game console.

329. The casino gaming apparatus as defined in claim 324, further comprising a fourth memory configured to store a random number generator program used for generating outcomes for the casino game wherein the random number generator program is stored and authenticated separately from the gaming data.

330. The casino gaming apparatus as defined in claim 324, further comprising a fourth memory, coupled to the processor, configured to store a boot code for the casino gaming apparatus.

331. The casino gaming apparatus as defined in claim 324, wherein, in response to an event generated while the casino gaming apparatus is available for game play, at least a portion of the gaming data is authenticated.

332. The casino gaming apparatus as defined in claim 324 wherein at least a portion of the gaming data is authenticated while the casino gaming apparatus is available for game play.

333. The casino gaming apparatus as defined in claim 324 further comprising a non-volatile memory operable to store gaming data relating to play of the casino game.

334. The casino gaming apparatus as defined in claim 324 wherein the video display unit is disposed in a remote location separate from said casino game console.

335. The casino gaming apparatus as defined in claim 324 further comprising a video subsystem, operatively coupled to the video display unit and operatively coupled to the processor, adapted for displaying still images, motion video or combinations thereof.

336. The casino gaming apparatus as defined in claim 324 wherein the processor is operable to generate a game play of a plurality of different casino games.

337. The casino gaming apparatus as defined in claim 324 wherein in response to receiving a selection of a first casino game from a plurality of different casino games, the casino gaming apparatus is operable to generate a play of the first casino game on the casino gaming apparatus.

338. The casino gaming apparatus as defined in claim 324 further comprising a sound-generating apparatus operatively coupled to the processor.

339. The casino gaming apparatus as defined in claim 324 wherein the network interface is designed to provide a wired connection or a wireless connection to the network.

340. A casino gaming apparatus comprising:

a casino game console;

a video display unit wherein the video display unit is disposed in a remote location separate from said casino game console;

a first memory providing an executable space for a processor disposed in said casino game console;

a second memory disposed in said casino game console, said second memory storing gaming data related to a casino game;

a third memory storing an operating system enabled to control a loading of the gaming data related to the casino game from the second memory to the first memory wherein the operating system is authenticated prior to an authentication of the gaming data related to the casino game; and the processor disposed in said casino game console and being operatively coupled to said video display unit, said first memory, said second memory, and the third memory;

said processor operable to cause an authentication of the operating system or the gaming data related to the casino game using one-way hashing functions; and said processor operable to cause a remedial action to be taken based on said authentication.

341. The casino gaming apparatus as defined in claim 340 wherein said processor is operable to send information relating to the authentication of the gaming data to a remote device.

342. The casino gaming apparatus as defined in claim 340 wherein said processor is operable to display informaton relating to the authentication of the gaming data on the video display unit.

343. The casino gaming apparatus as defined in claim 340, wherein the second memory is a read-only memory.

344. The casino gaming apparatus as defined in claim 340, wherein the second memory is disposed in a remote location separate from said casino game console.

345. The casino gaming apparatus as defined in claim 340, further comprising a fourth memory configured to store a random number generator program used for generating outcomes for the casino game wherein the random number generator program is stored and authenticated separately from the gaming data.

346. The casino gaming apparatus as defined in claim 340, further comprising a fourth memory, coupled to the processor, configured to store a boot code for the casino gaming apparatus.

347. The casino gaming apparatus as defined in claim 340, wherein, in response to an event generated while the casino gaming apparatus is available for game play, at least a portion of the gaming data is authenticated.

348. The casino gaming apparatus as defined in claim 340 wherein at least a portion of the gaming data is authenticated while the casino gaming apparatus is available for game play.

349. The casino gaming apparatus as defined in claim 340 further comprising a non-volatile memory operable to store gaming data relating to play of the casino game.

350. The casino gaming apparatus as defined in claim 340 futher comprising at least one peripheral device coupled to the casino game console including a memory device wherein the processor is operable to authenticate contents of the memory device.

351. The casino gaming apparatus as defined in claim 340 further comprising a video subsystem, operatively coupled to the video display unit and operatively coupled to the processor, adapted for displaying still images, motion video or combinations thereof.

352. The casino gaming apparatus as defined in claim 340 wherein the processor is operable to generate a game play of a plurality of different casino games.

353. The casino gaming apparatus as defined in claim 340 wherein in response to receiving a selection of a first casino game from a plurality of different casino games, the casino gaming apparatus is operable to generate a play of the first casino game on the casino gaming apparatus.

354. The casino gaming apparatus as defined in claim 340 further comprising a sound-generating apparatus operatively coupled to the processor.

355. The casino gaming apparatus as defined in claim 340 wherein the network interface is designed to provide a wired connection or a wireless connection to the network.

356. A casino gaming apparatus comprising:

a casino game console;

a video display unit;

a first memory providing an executable space for a processor in said casino game console;

a second memory disposed in said casino console, said second memory having gaming data relating to a casino game stored therein;

a third memory, being disposed in said casino game console, storing system logic for reading files in a file system stored on the second memory;

a fourth memory configured to store a random number generator program used for generating outcomes for the casino game wherein the random nmber generator program is stored and authenticated separately from the gaming data;

the processor disposed in said casino game console and being operatively coupled to said video display unit, said first memory, said second memory, and said third memory;

said processor operable to i) to cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;

wherein the system logic is authenticated prior to authenticating the gaming data relating to the casino game stored on the second memory.

357. The casino gaming apparatus as defined in claim 356 wherein said processor is operable to send information relating to the authentication of the gaming data to a remote device.

358. The casino gaming apparatus as defined in claim 356 wherein said processor is operable to display information relating to the authentication of the gaming data on the video display unit.

359. The casino gaming apparatus as defined in claim 356, wherein the third memory and the fourth memory are located on a same memory device.

360. The casino gaming apparatus as defined in claim 356, wherein the fourth memory is further configured to store a boot code for the casino gaming apparatus.

361. The casino gaming apparatus as defined in claim 356, wherein, in response to an event generated while the casino gaming apparatus is available for game play, at least a portion of the gaming data is authenticated.

362. The casino gaming apparatus as defined in claim 356, wherein at least a portion of the gaming data is authenticated while the casino gaming apparatus is available for game play.

363. The casino gaming apparatus as defined in claim 356 wherein the system logic is a component of an operating system.

364. The casino gaming apparatus as defined in claim 356 further comprising at least one peripheral device coupled to the casino game console including a memory device wherein the processor is operable to authenticate contents of the memory device.

365. The casino gaming apparatus as defined in claim 356 further comprising a non-volatile memory operable to store gaming data relating to play of the casino game.

366. The casino gaming apparatus as defined in claim 356 wherein the video display unit is disposed in a remote location separate from said casino game console.

367. The casino gaming apparatus as defined in claim 356 further comprising a video subsystem, operatively coupled to the video display unit and operatively coupled to the processor, adapted for displaying still images, motion video or combinations thereof.

368. The casino gaming apparatus as defined in claim 356 wherein the processor is operable to generate a game play of a plurality of different casino games.

369. The casino gaming apparatus as defined in claim 356 wherein in response to receiving a selection of a first casino game from a plurality of different casino games, the casino gaming apparatus is operable to generate a play of the first casino game on the casino gaming apparatus.

370. The casino gaming apparatus as defined in claim 356 further comprising a sound-generating apparatus operatively coupled to the processor.

371. The casino gaming apparatus as defined in claim 356 further comprising a network interface wherein the network interface is designed to provide a wired connection or a wireless connection to a network.

372. A casino gaming apparatus comprising:

a casino game console;

a video display unit;

a first memory providing an executable space for a processor in said casino game console;

a second memory disposed in said casino game console, said second memory having gaming data relating to a casino game stored therein;

a third memory, being disposed in said casino game console, storing system logic for reading files in a file system stored on the second memory;

wherein, in response to an event generated while the casino gaming apparatus is available for game play, at least a portion of the gaming data is authenticated;

the processor disposed in said casino game console and being operatively coupled to said video display unit, said first memory, said second memory, and said third memory;

said processor operable to i) cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;

wherein the system logic is authenticated prior to authenticating the gaming data relating to the casino game stored on the second memory.

373. The casino gaming apparatus as defined in claim 372 wherein said processor is operable to send information relating to the authentication of the gaming data to a remote device.

374. The casino gaming apparatus as defined in claim 372 wherein said processor is operable to display information relating to the authentication of the gaming data on the video display unit.

375. The casino gaming apparatus as defined in claim 372, wherein the second memory is operable as a read-only memory.

376. The casino gaming apparatus as defined in claim 372, wherein the second memory is disposed in a remote location separate from said casino game console.

377. The casino gaming apparatus as defined in claim 372, further comprising a fourth memory configured to store a random number generator program used for generating outcomes for the casino game wherein the random number generator program is stored and authenticated separately from the gaming data.

378. The casino gaming apparatus as defined in claim 372, further comprising a fourth memory, coupled to the processor, configured to store a boot code for the casino gaming apparatus.

379. The casino gaming apparatus as defined in claim 372 wherein the system logic is a component of an operating system.

380. The casino gaming apparatus as defined in claim 372 further comprising at least one peripheral device coupled to the casino game console including a memory device wherein the processor is operable to authenticate contents of the memory device.

381. The casino gaming apparatus as defined in claim 372 further comprising a non-volatile memory operable to store gaming data relating to play of the casino game.

382. The casino gaming apparatus as defined in claim 372 wherein the video display unit is disposed in a remote location separate from said casino game console.

383. The casino gaming apparatus as defined in claim 372 further comprising a video subsystem, operatively coupled to the video display unit and operatively coupled to the processor, adapted for displaying still images, motion video or combinations thereof.

384. The casino gaming apparatus as defined in claim 372 wherein the processor is operable to generate a game play of a plurality of different casino games.

385. The casino gaming apparatus as defined in claim 372 wherein in response to receiving a selection of a first casino game from a plurality of different casino games, the casino gaming apparatus is operable to generate a play of the first casino game on the casino gaming apparatus.

386. The casino gaming apparatus as defined in claim 372 further comprising a sound-generating apparatus operatively coupled to the processor.

387. The casino gaming apparatus as defined in claim 372 further comprising a network interface wherein the network interface is designed to provide a wired connection or a wireless connection to a network.

388. A casino gaming apparatus comprising:

a casino game console;

a video display unit;

a first memory providing an executable space for a processor in said casino game console;

a second memory disposed in said casino game console, said second memory having game data relating to a casino game stored therein;

a third memory, being disposed in said casino game console, storing system logic for reading files in a file system stored on the second memory;

wherein at least a portion of the gaming data is authenticated while the casino gaming apparatus is available for game play;

the processor disposed in said casino game console and being operatively coupled to said video display unit, said first memory, said second memory, and said third memory;

said processor operable to i) cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;

wherein the system logic is authenticated prior to authenticating the gaming data relating to the casino game stored on the second memory.

389. The casino gaming apparatus as defined in claim 388 wherein said processor is operable to send information relating to the authentication of the gaming data to a remote device.

390. The casino gaming apparatus as defined in claim 388 wherein said processor is operable to display information relating to the authentication of the gaming data on the video display unit.

391. The casino gaming apparatus as defined in claim 388, wherein the second memory is operable as a read-only memory.

392. The casino gaming apparatus as defined in claim 388, wherein the second memory is disposed in a remote location separate from said casino game console.

393. The casino gaming apparatus as defined in claim 388, further comprising a fourth memory configured to store a random number generator program used for generating outcomes for the casino game wherein the random number generator program is stored and authenticated separately from the gaming data.

394. The casino gaming apparatus as defined in claim 388, further comprising a fourth memory, coupled to the processor, configured to store a boot code for the casino gaming apparatus.

395. The casino gaming apparatus as defined in claim 388, wherein, in response to an event generated while the casino gaming apparatus is available for game play, at least a portion of the gaming data is authenticated.

396. The casino gaming apparatus as defined in claim 388 wherein the system logic is a component of an operating system.

397. The casino gaming apparatus as defined in claim 388 further comprising at least one peripheral device coupled to the casino game console including a memory device wherein the processor is operable to authenticate contents of the memory device.

398. The casino gaming apparatus as defined in claim 388 further comprising a non-volatile memory operable to store gaming data relating to play of the casino game.

399. The casino gaming apparatus as defined in claim 388 wherein the video display unit is disposed in a remote location separate from said casino game console.

400. The casino gaming apparatus as defined in claim 388 further comprising a video subsystem, operatively coupled to the video display unit and operatively coupled to the processor, adapted for displaying still images, motion video or combinations thereof.

401. The casino gaming apparatus as defined in claim 388 wherein the processor is operable to generate a game play of a plurality of different casino games.

402. The casino gaming apparatus as defined in claim 388 wherein in response to receiving a selection of a first casino game from a plurality of different casino games, the casino gaming apparatus is operable to generate a play of the first casino game on the casino gaming apparatus.

403. The casino gaming apparatus as defined in claim 388 further comprising a sound-generating apparatus operatively coupled to the processor.

404. The casino gaming apparatus as defined in claim 388 further comprising a network interface wherein the network interface is designed to provide a wired connection or a wireless connection to a network.

405. A casino gaming apparatus comprising:

a casino game console;

a video display unit;

a first memory providing an executable space for a processor in said casino game console;

a second memory disposed in said casino game console, said second memory having gaming data relating to a casino game stored therein;

a third memory, being disposed in said casino game console, storing system logic for reading files in a file system stored on the second memory;

at least one peripheral device coupled to the casino game console including a memory device wherein the processor is operable to authenticate contents of the memory device;

the processor disposed in said casino game console and being operatively coupled to said video display unit, said first memory, said second memory, and said third memory;

said processor operable to i) cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;

wherein the system logic is authenticated prior to authenticating the gaming data relating to the casino game stored on the second memory.

406. The casino gaming apparatus as defined in claim 405 wherein said processor is operable to send information relating to the authentication of the gaming data to a remote device.

407. The casino gaming apparatus as defined in claim 405 wherein said processor is operable to display information relating to the authentication of the gaming data on the video display unit.

408. The casino gaming apparatus as defined in claim 405, wherein the second memory is operable as a read-only memory.

409. The casino gaming apparatus as defined in claim 405, wherein the second memory is disposed in a remote location separate from said casino game console.

410. The casino gaming apparatus as defined in claim 405, further comprising a fourth memory configured to store a random number generator program used for generating outcomes for the casino game wherein the random number generator program is stored and authenticated separately from the gaming data.

411. The casino gaming apparatus as defined in claim 405, further comprising a fourth memory, coupled to the processor, configured to store a boot code for the casino gaming apparatus.

412. The casino gaming apparatus as defined in claim 405, wherein, in response to an event generated while the casino gaming apparatus is available for game play, at least a portion of the gaming data is authenticated.

413. The casino gaming apparatus as defined in claim 405 wherein the system logic is a component of an operating system.

414. The casino gaming apparatus as defined in claim 405 wherein at least a portion of the gaming data is authenticated while the casino gaming apparatus is available for game play.

415. The casino gaming apparatus as defined in claim 405 further comprising a non-volatile memory operable to store gaming data relating to play of the casino game.

416. The casino gaming apparatus as defined in claim 405 wherein the video display unit is disposed in a remote location separate from said casino game console.

417. The casino gaming apparatus as defined in claim 405 further comprising a video subsystem, operatively coupled to the video display unit and operatively coupled to the processor, adapted for displaying still images, motion video or combinations thereof.

418. The casino gaming apparatus as defined in claim 405 wherein the processor is operable to generate a game play of a plurality of different casino games.

419. The casino gaming apparatus as defined in claim 405 wherein in response to receiving a selection of a first casino game from a plurality of different casino games, the casino gaming apparatus is operable to generate a play of the first casino game on the casino gaming apparatus.

420. The casino gaming apparatus as defined in claim 405 further comprising a sound-generating apparatus operatively coupled to the processor.

421. The casino gaming apparatus as defined in claim 405 further comprising a network interface wherein the network interface is designed to provide a wired connection or a wireless connection to a network.

422. A casino gaming apparatus comprising:

a casino game console;

a video display unit wherein the video display unit is disposed in a remote location separate from said casino game console;

a first memory providing an executable space for a processor in said casino game console;

a second memory disposed in said casino game console, said second memory having gaming data relating to a casino game stored therein;

a third memory, being disposed in said casino game console, storing system logic for reading files in a file system stored on the second memory;

the processor disposed in said casino game console and being operatively coupled to said video display unit, said first memory, said second memory, and said third memory;

said processor operable to i) cause data relating to the system logic to be authenticated based on a comparison of a hash value generated from the data relating to the system logic and a known hash value and ii) to cause the gaming data relating to the casino game to be authenticated based on a comparison of a first hash value generated from the gaming data transferred to the first memory with a known first hash value;

wherein the system logic is authenticated prior to authenticating the gaming data relating to the casino game stored on the second memory.

423. The casino gaming apparatus as defined in claim 422 wherein said processor is operable to send information relating to the authentication of the gaming data to a remote device.

424. The casino gaming apparatus as defined in claim 422 wherein said processor is operable to display information relating to the authentication of the gaming data on the video display unit.

425. The casino gaming apparatus as defined in claim 422, wherein the second memory is disposed in a remote location separate from said casino game console.

426. The casino gaming apparatus as defined in claim 422, wherein the second memory is operable as a read-only memory.

427. The casino gaming apparatus as defined in claim 422, further comprising a fourth memory configured to store a random number generator program used for generating outcomes for the casino game wherein the random number generator program is stored and authenticated separately from the gaming data.

428. The casino gaming apparatus as defined in claim 422, further comprising a fourth memory, coupled to the processor, configured to store a boot code for the casino gaming apparatus.

429. The casino gaming apparatus as defined in claim 422 wherein, in response to an event generated while the casino gaming apparatus is available for game play, at least a portion of the gaming data is authenticated.

430. The casino gaming apparatus as defined in claim 422 wherein the system logic is a component of an operating system.

431. The casino gaming apparatus as defined in claim 422 wherein at least a portion of the gaming data is authenticated while the casino gaming apparatus is available for game play.

432. The casino gaming apparatus as defined in claim 422 further comprising a non-volatile memory operable to store gaming data relating to play of the casino game.

433. The casino gaming apparatus as defined in claim 422 further comprising at least one peripheral device copuled to the casino game console including a memory device wherein the processor is operable to authenticate contents of the memory device.

434. The casino gaming apparatus as defined in claim 422 further comprising a video subsystem, operatively coupled to the video display unit and operatively coupled to the processor, adapted for displaying still images, motion video or combinations thereof.

435. The casino gaming apparatus as defined in claim 422 wherein the processor is operable to generate a game play of a plurality of different casino games.

436. The casino gaming apparatus as defined in claim 422 wherein in response to receiving a selection of a first casino game from a plurality of different casino games, the casino gaming apparatus is operable to generate a play of the first casino game on the casino gaming apparatus.

437. The casino gaming apparatus as defined in claim 422 further comprising a sound-generating apparatus operatively coupled to the processor.

438. The casino gaming apparatus as defined in claim 422 further comprising a network interface wherein the network interface is designed to provide a wired connection or a wireless connection to a network.

* * * * *